(12) United States Patent
Yamanaka

(10) Patent No.: US 8,902,350 B2
(45) Date of Patent: Dec. 2, 2014

(54) INTERCHANGEABLE LENS, CONTROL METHOD THEREOF, IMAGE PICKUP APPARATUS AND CONTROL METHOD THEREOF

(71) Applicant: Canon Kabushiki Kaisha, Tokyo (JP)

(72) Inventor: Tomoaki Yamanaka, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 55 days.

(21) Appl. No.: 13/864,383

(22) Filed: Apr. 17, 2013

(65) Prior Publication Data

US 2013/0278816 A1 Oct. 24, 2013

(30) Foreign Application Priority Data

Apr. 23, 2012 (JP) ................. 2012-097893

(51) Int. Cl.
*H04N 5/232* (2006.01)
*G03B 17/14* (2006.01)
*G03B 3/10* (2006.01)

(52) U.S. Cl.
CPC ........ *H04N 5/23296* (2013.01); *G03B 2206/00* (2013.01); *H04N 5/23209* (2013.01); *G03B 17/14* (2013.01); *G03B 3/10* (2013.01); *H04N 5/23212* (2013.01)
USPC ........................................................ 348/353

(58) Field of Classification Search
CPC .............................. H04N 5/23212; G02B 7/28
See application file for complete search history.

(56) References Cited

U.S. PATENT DOCUMENTS

| 2011/0064397 A1 | 3/2011 | Shibuno et al. |
| 2012/0147255 A1 | 6/2012 | Yasuda |
| 2012/0183285 A1 | 7/2012 | Shibuno et al. |

FOREIGN PATENT DOCUMENTS

| JP | 2009-258718 A | 11/2009 |
| JP | 2011-257450 A | 12/2011 |

*Primary Examiner* — Gary C Vieaux
(74) *Attorney, Agent, or Firm* — Rossi, Kimms & McDowell LLP

(57) ABSTRACT

The interchangeable lens includes a lens controller to control drive speed of a focus actuator moving a focus lens by using speed control data. The image pickup apparatus includes a focus controller to acquire focus information by using an image pickup signal from an image sensor. The lens controller receives, from the focus controller, timing information showing a timing relating to acquisition of the focus information, performs a reachability determination for determining, by using the timing information and the speed control data, whether or not the focus lens is able to reach a target focus information acquisition position by a scheduled focus information acquisition timing and performs, when determining that the focus lens is not able to reach target focus information acquisition position by scheduled focus information acquisition timing, calculation of a predictive focus position at scheduled focus information acquisition timing by using speed control data.

8 Claims, 15 Drawing Sheets

FOCUS ACTUATOR ACCELERATION DATA

| ACCELERATION SPEED | ACCELERATION STEP NUMBER |
|---|---|
| 200pps | 1step |
| 300pps | 1step |
| 400pps | 1step |
| 500pps | - |

FOCUS ACTUATOR DECELERATION DATA

| DECELERATION SPEED | DECELERATION STEP NUMBER |
|---|---|
| 500pps | - |
| 400pps | 1step |
| 300pps | 1step |
| 200pps | 1step |

ACQUISITION START TIMING IS DURING ACCELERATION DRIVE

ACQUISITION START TIMING IS DURING CONSTANT-SPEED DRIVE

ACQUISITION START TIMING IS DURING DECELERATION DRIVE TIMING

FOCUS ACTUATOR ACCELERATION DATA

| ACCELERATION SPEED | ACCELERATION STEP NUMBER |
|---|---|
| 200pps | $5 \times 10^{-3}$ s |
| 300pps | $5 \times 10^{-3}$ s |
| 400pps | $5 \times 10^{-3}$ s |
| 500pps | - |

FOCUS ACTUATOR DECELERATION DATA

| DECELERATION SPEED | DECELERATION STEP NUMBER |
|---|---|
| 500pps | - |
| 400pps | $5 \times 10^{-3}$ s |
| 300pps | $5 \times 10^{-3}$ s |
| 200pps | $5 \times 10^{-3}$ s |

FIG. 9

INTERCHANGEABLE LENS, CONTROL METHOD THEREOF, IMAGE PICKUP APPARATUS AND CONTROL METHOD THEREOF

BACKGROUND OF THE INVENTION

1. Field of the Invention

The present invention relates to an interchangeable lens attachable to an image pickup apparatus capable of performing so-called contrast AF.

2. Description of the Related Art

Image pickup apparatuses such as digital still cameras and video cameras acquire or produce, from a video signal obtained through photoelectric conversion of an object image by an image sensor, an focus evaluation value signal (focus information) that shows a contrast state of video (imaging contrast). The image pickup apparatuses move a focus lens to an in-focus position where the focus evaluation value signal becomes maximum to perform a contrast detection method autofocus (contrast AF). The contrast AF is also called TVAF.

For the contrast AF, a relationship between the focus evaluation value signal and a position of the focus lens for acquisition thereof is important. Particularly, in a lens-interchangeable image pickup apparatus to which an interchangeable lens is detachably attachable, since the image pickup apparatus produces the focus evaluation value signal and the interchangeable lens drives the focus lens, it is necessary to appropriately manage timings for acquisition of the focus evaluation value signal and timings for drive of the focus lens.

Japanese Patent Laid-Open No. 2009-258718 discloses a method of setting drive timings of a focus lens in a lens-interchangeable image pickup system performing contrast AF. Moreover, Japanese Patent Laid-Open No. 2011-257450 discloses a method for improving focusing accuracy in which an interchangeable lens performs an in-focus position calculation using focus lens positions detected according to a synchronization signal from an image pickup apparatus performing contrast AF.

If the lens-interchangeable image pickup apparatus is capable of managing the drive timing of the focus lens without delay with respect to the acquisition timing of the focus evaluation value signal, it is possible to always acquire the focus evaluation value signal at appropriate focus lens positions and there is no problem. However, it is difficult for the image pickup apparatus to perform communication with the interchangeable lens to send thereto an instruction for causing the interchange lens to start drive of the focus lens and an instruction for causing the interchangeable lens to acquire a reaching position of the focus lens without timing delay while performing other processes.

To solve the problem, the image pickup apparatus may perform prediction calculation of the focus lens position. However, interchangeable lenses of mutually different types perform mutually different speed controls (acceleration and deceleration controls) for an actuator such as a motor. Therefore, it is not easy for the image pickup apparatus to accurately perform the prediction calculation of the focus lens position without delay with respect to actual drive of the focus lens.

BRIEF SUMMARY OF THE INVENTION

The present invention provides an interchangeable lens capable of causing a lens-interchangeable image pickup apparatus to acquire focus information at appropriate focus lens positions, and provides a lens-interchangeable image pickup apparatus detachably attachable to the interchangeable lens.

The present invention provides as one aspect thereof an interchangeable lens detachable from an image pickup apparatus and capable of communication with the image pickup apparatus. The interchangeable lens includes an image pickup optical system including a focus lens, a focus actuator to move the focus lens, a memory to store speed control data to be used for control of drive speed of the focus actuator, and a lens controller configured to control the drive speed of the focus actuator by using the speed control data. The image pickup apparatus includes an image sensor to photoelectrically convert an object image formed by the image pickup optical system to produce an image pickup signal, and a focus controller configured to acquire, by using the image pickup signal, focus information corresponding to image contrast that changes with movement of the focus lens and to control a focusing movement of the focus lens to an in-focus position by using the focus information. The lens controller is configured to receive, from the focus controller, timing information showing a timing relating to acquisition of the focus information, to perform a reachability determination for determining, by using the timing information and the speed control data, whether or not the focus lens is able to reach a target focus information acquisition position at which the focus controller acquires the focus information by a scheduled focus information acquisition timing, to perform, when determining in the reachability determination that the focus lens is not able to reach the target focus information acquisition position by the scheduled focus information acquisition timing, calculation of a predictive position of the focus lens at the scheduled focus information acquisition timing by using the speed control data and to send the predictive position to the focus controller.

The present invention provides as another aspect thereof a control method for an interchangeable lens detachable from an image pickup apparatus and capable of communication with the image pickup apparatus. The interchangeable lens includes an image pickup optical system including a focus lens, and a focus actuator to move the focus lens. The image pickup apparatus includes an image sensor to photoelectrically convert an object image formed by the image pickup optical system to produce an image pickup signal, and a focus controller configured to acquire, by using the image pickup signal, focus information corresponding to image contrast that changes with movement of the focus lens and to control a focusing movement of the focus lens to an in-focus position by using the focus information. The method includes providing speed control data to be used for control of drive speed of the focus actuator, controlling the drive speed of the focus actuator by using the speed control data, receiving, from the focus controller, timing information showing a timing relating to acquisition of the focus information, performing a reachability determination for determining, by using the timing information and the speed control data, whether or not the focus lens is able to reach a target focus information acquisition position at which the focus controller acquires the focus information by a scheduled focus information acquisition timing, performing, when determining in the reachability determination that the focus lens is not able to reach the target focus information acquisition position by the scheduled focus information acquisition timing, calculation of a predictive position of the focus lens at the scheduled focus information acquisition timing by using the speed control data, and sending the predictive position to the focus controller.

The present invention provides as still another aspect thereof an image pickup apparatus from which an interchangeable lens is detachable and which is capable of communication with the interchangeable lens. The interchangeable lens includes an image pickup optical system including a focus lens, a focus actuator to move the focus lens, a memory to store speed control data to be used for control of drive speed of the focus actuator, and a lens controller configured to control the drive speed of the focus actuator by using the speed control data. The image pickup apparatus includes an image sensor to photoelectrically convert an object image formed by the image pickup optical system to produce an image pickup signal, and a focus controller configured to acquire, by using the image pickup signal, focus information corresponding to image contrast that changes with movement of the focus lens, and to control a focusing movement of the focus lens to an in-focus position by using the focus information. The focus controller is configured to send, to the lens controller, timing information showing a timing relating to acquisition of the focus information. The lens controller is configured to perform a reachability determination for determining, by using the timing information and the speed control data, whether or not the focus lens is able to reach a target focus information acquisition position at which the focus controller acquires the focus information by a scheduled focus information acquisition timing, to perform, when determining in the reachability determination that the focus lens is not able to reach the target focus information acquisition position by the scheduled focus information acquisition timing, calculation of a predictive position of the focus lens at the scheduled focus information acquisition timing by using the speed control data and to send the predictive position to the focus controller. The focus controller is configured to control the focusing movement of the focus lens on a basis of the received predictive position and the focus information acquired at the scheduled focus information acquisition timing.

The present invention provides as yet still another aspect thereof a control method for an image pickup apparatus from which an interchangeable lens is detachable and which is capable of communication with the interchangeable lens. The interchangeable lens includes an image pickup optical system including a focus lens, and a focus actuator to move the focus lens and being capable of controlling drive speed of the focus actuator by using speed control data stored in a memory. The image pickup apparatus includes an image sensor to photoelectrically convert an object image formed by the image pickup optical system to produce an image pickup signal, and a focus controller configured to acquire, by using the image pickup signal, focus information corresponding to image contrast that changes with movement of the focus lens and to control a focusing movement of the focus lens to an in-focus position by using the focus information. The method includes sending, to the interchangeable lens, timing information showing a timing relating to acquisition of the focus information, receiving a predictive position of the focus lens from the interchangeable lens performing a reachability determination for determining, by using the timing information and the speed control data, whether or not the focus lens is able to reach a target focus information acquisition position at which the focus controller acquires the focus information by a scheduled focus information acquisition timing and calculating, when determining in the reachability determination that the focus lens is not able to reach the target focus information acquisition position by the scheduled focus information acquisition timing, the predictive position of the focus lens at the scheduled focus information acquisition timing by using the speed control data, and controlling the focusing movement of the focus lens on a basis of the received predictive position and the focus information acquired at the scheduled focus information acquisition timing.

Other aspects of the present invention will become apparent from the following description and the attached drawings.

BRIEF DESCRIPTION OF THE DRAWINGS

FIG. 9 shows focus actuator acceleration table data and focus actuator deceleration table data in Embodiment 2 of the present invention.

DETAILED DESCRIPTION OF THE PREFERRED EMBODIMENTS

Exemplary embodiments of the present invention will hereinafter be described with reference to the accompanying drawings.

Embodiment 1

Figure 1:
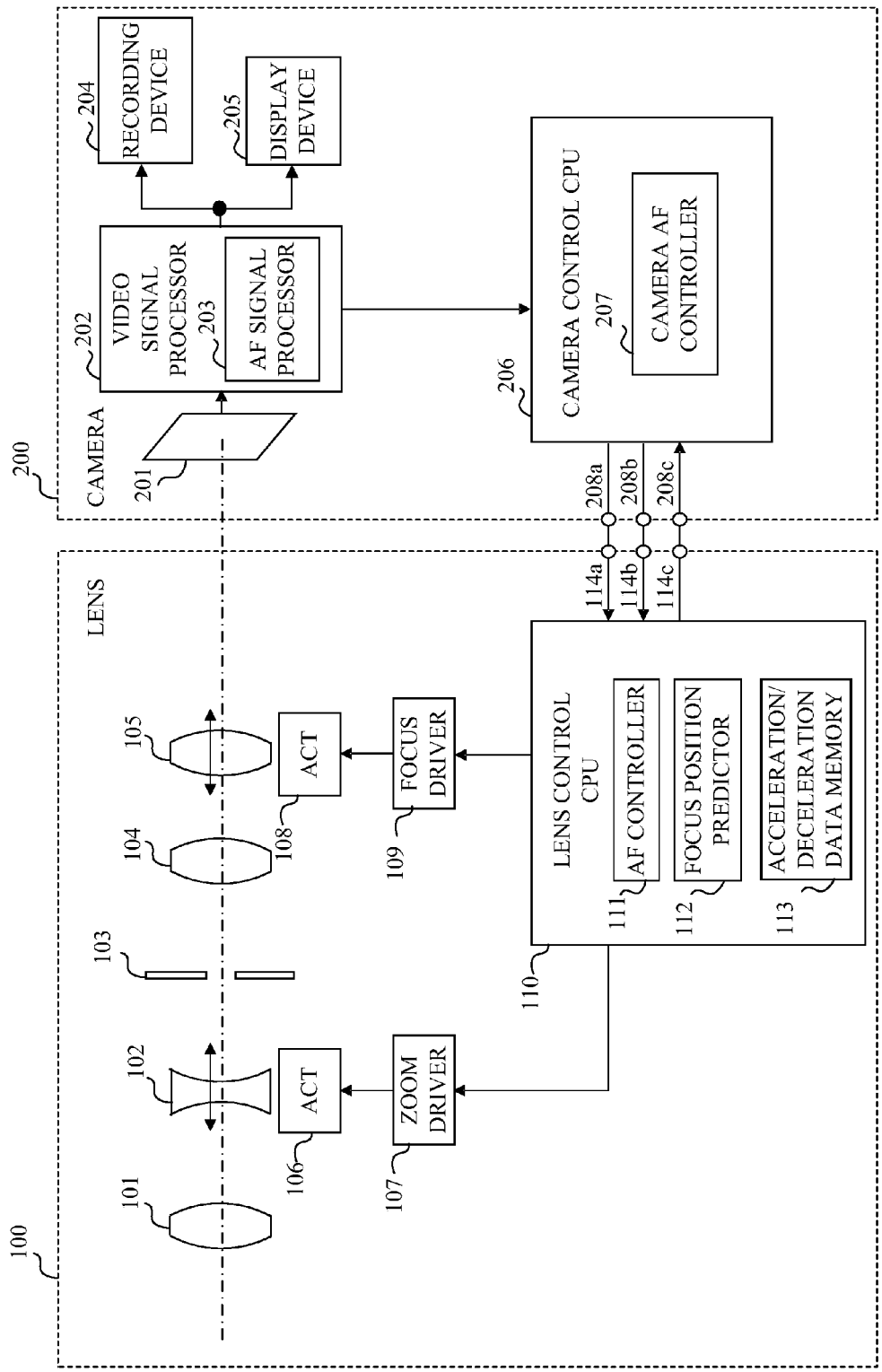
FIG. 1 is a block diagram showing a configuration of a lens-interchangeable image pickup system that is Embodiment 1 of the present invention, the system including an interchangeable lens and a camera.

FIG. 1 shows a configuration of a lens-interchangeable image pickup system constituted by an interchangeable lens 100 and an image pickup apparatus (hereinafter referred to as "a camera body") 200 to which the interchangeable lens 100 is detachably attachable (in other words, from which the interchangeable lens 100 is detachable).

In this embodiment, the camera body 200 controls drive of a focus lens 105 (actually, drive of a focus actuator 108 that moves the focus lens 105) provided in the interchangeable lens 100 to perform contrast AF (TVAF). Specifically, the camera body 200 acquires a focus evaluation value signal (described later) as focus information after each movement of the focus lens 105 by a predetermined amount and moves the focus lens 105 to an in-focus position by using the focus evaluation value signal.

Figures 6, 7A:
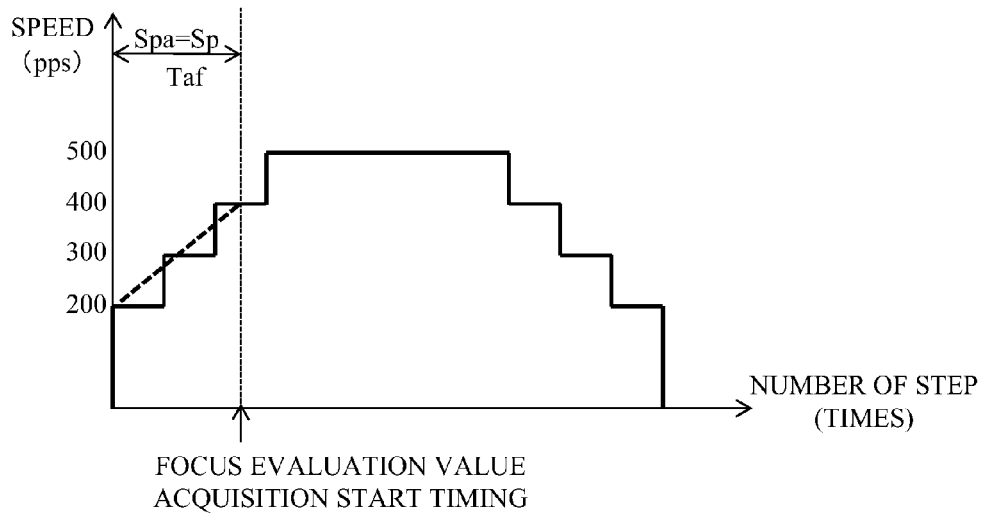
FIG. 6 shows focus actuator acceleration table data and focus actuator deceleration table data in Embodiment 1.
FIGS. 7A to 7C show focus evaluation value acquisition timings and focus lens drive patterns in Embodiment 1.

In the contrast AF, the interchangeable lens 100 determines in terms of time, by using focus actuator acceleration data and focus actuator deceleration data, whether or not the focus lens 105 is able to reach a target position (hereinafter referred to as "a target focus evaluation value acquisition position") at which the camera body 200 acquires the focus evaluation value signal by a scheduled timing (hereinafter referred to as "a scheduled focus evaluation value acquisition timing") for the acquisition thereof. The target focus evaluation value acquisition position and the scheduled focus evaluation value acquisition timing respectively correspond to a target focus information acquisition position and a scheduled focus information acquisition timing. Moreover, the focus actuator acceleration data and the focus actuator deceleration data, which correspond to speed control data and are hereinafter collectively referred to as "acceleration/deceleration data", are, as shown in FIG. 6, table data including information on speed (pps) and number of steps (step) for acceleration and deceleration. The number of steps for acceleration and the number of steps for deceleration are hereinafter respectively referred to as "an acceleration step number" and "a deceleration step number". The acceleration/deceleration data is stored (provided) in a memory (described later) in advance. Furthermore, information on the target focus evaluation value acquisition position is sent from the camera body 200 to the interchangeable lens 100.

The interchangeable lens 100 performs, when determining in the above-mentioned reachability determination in terms of time that the focus lens 105 is not able to reach the target focus evaluation value acquisition position by the scheduled focus evaluation value acquisition timing, calculation of a predictive position of the focus lens 105 at the scheduled focus evaluation value acquisition timing by using the acceleration/deceleration data. The position of the focus lens 105 is hereinafter referred to as "a focus position". In addition, the interchangeable lens 100 sends the calculated predictive position of the focus lens 105 (hereinafter referred to as "a predictive focus position") as a result of this prediction calculation to the camera body 200.

On the other hand, when determining in the above-mentioned reachability determination that the focus lens 105 is able to reach the target focus evaluation value acquisition position by the scheduled focus evaluation value acquisition timing, the interchangeable lens 100 does not perform the prediction calculation of the predictive focus position by using the acceleration/deceleration data. In this case, the interchangeable lens 100 sends, as the predictive focus position at the scheduled focus evaluation value acquisition timing, a position identical to the target focus evaluation value acquisition position to the camera body 200. The predictive focus position calculated by using the acceleration/deceleration data and the predictive focus position identical to the target focus evaluation value acquisition position are each information according to a result of the reachability determination.

As shown in FIG. 1, attachment of the interchangeable lens 100 to the camera body 200 brings electrical contacts 114a, 114b and 114c provided in the interchangeable lens 100 in contact with electrical contacts 208a, 208b and 208c provided in the camera body 200. This contact of the electrical contacts enables communication of various information between the interchangeable lens 100 and the camera body 200 and enables supply of power from the camera body 200 to the interchangeable lens 100.

In the interchangeable lens 100, an image pickup optical system includes, in order from an object side in an optical axis direction, a fixed front lens 101, a magnification-varying lens 102, an aperture stop 103, a fixed afocal lens 104 and the focus lens 105. Although FIG. 1 shows as if each of the lenses 101, 102, 104 and 105 is constituted of one lens element, each of the lenses 101, 102, 104 and 105 is actually constituted of one or two or more lens elements.

The magnification-varying lens 102 is moved in the optical axis direction for variation of magnification by a zoom actuator 106 constituted by a stepping motor, a DC motor or the like. A zoon driver 107 supplies a drive current to the zoom actuator 106.

The focus lens 105 is moved in the optical axis direction for focusing by the focus actuator 108 constituted by a stepping motor, a voice coil motor or the like. A focus driver 109 supplies a drive current to the focus actuator 108.

On the other hand, the camera body 200 is provided with an image sensor 201 as a photoelectric conversion element such as a CCD sensor or a CMOS sensor. The image sensor 201 photoelectrically converts an optical image (object image) formed on its image pickup surface by the image pickup optical system. Charges accumulated in the image sensor 201 by its photoelectric conversion is output as an image pickup signal (analog signal) at a predetermined timing to be input to a video signal processor 202.

The video signal processor 202 converts the analog image pickup signal from the image sensor 201 into a digital image pickup signal and performs various signal processes thereon to produce a video signal. The video signal is output to a camera control CPU 206, a display device 205 such as a liquid crystal panel and to a recording device 204 such as an optical disc or a semiconductor memory.

Moreover, the video signal processor 202 is provided therein with an AF signal processor 203 as a focus information producer. The AF signal processor 203 extracts, from the image pickup signal output from the image sensor 201 (or from the video signal produced by using the image pickup signal), a high frequency component or a brightness component obtained by pixels in an AF area (focus detection area) to produce the focus evaluation value signal (focus information). The focus evaluation value signal shows a contrast state (or sharpness) of captured video, that is, image information which changes with movement of the focus lens 105. A focus position at which value of the focus evaluation value signal (hereinafter referred to as "focus evaluation value") becomes maximum (peak) is an in-focus position in the AF area.

A camera control CPU 206 includes a camera AF controller 207. The camera AF controller 207 performs, by using the focus evaluation value signal from the AF signal processor 203, determination of a direction of the in-focus position and determination of whether or not an in-focus state is obtained. Moreover, the camera AF controller 207 sends instructions relating to drive of the focus lens 105 to a lens control CPU 110 provided in the interchangeable lens 100. The signal processor 203 and the camera AF controller 207 constitute a focus controller.

As described above, the interchangeable lens 100 and the camera body 200 can communicate with each other through the electric contacts 114a to 114c and the electric contacts 208a to 208c. FIG. 1 shows a case where the interchangeable lens 100 and the camera body 200 perform three-line serial communication. In this embodiment, the lens control CPU 110 and the camera control CPU 206 performs packet communication at timings synchronizing with a vertical synchronization signal of the captured video.

From the lens control CPU 110 to the camera control CPU 206, a primary communication is performed for sending various information including the predictive focus position. On the other hand, from the camera control CPU 206 to the lens control CPU 110, a secondary communication is performed for sending timing information and target focus position information. The timing information shows timings relating to the acquisition of the focus evaluation value signal such as a start timing of the acquisition of the focus evaluation value signal (which is the above-mentioned scheduled focus evaluation value signal acquisition timing and hereinafter also referred to as "a focus evaluation value acquisition start timing") and a start timing for the movement of the focus lens 105 (hereinafter also referred to as "a drive start timing"). The target focus position information shows a focus position at which the focus evaluation value signal is acquired, that is, the above-mentioned target focus evaluation value signal acquisition position, and is hereinafter also referred to as "a target focus position" or "a target position".

In the following description, the timing information and the target focus position information are collectively referred to as "focus control information". The primary communication and the secondary communication are respectively performed at least once in one period of the vertical synchronization signal.

The lens control CPU 110 as a lens controller includes the lens AF controller 111, a focus lens position predictor 112 and an acceleration/deceleration data memory 113. The lens AF controller 111 controls the movement of the focus lens 105 to the target focus position that is decided by the camera AF controller 207 and sent from the camera control CPU 206.

The focus position predictor 112 performs, in the contrast AF, the reachability determination to predict in terms of time whether or not the focus position is able to reach the target focus position by the focus evaluation value acquisition start timing. Moreover, the focus position predictor 112 calculates the predictive focus position. The reachability determination and calculation of the predictive focus position will be described below.

The acceleration/deceleration data memory 113 is constituted by a storage element such as an EEPROM or a flash ROM and stores the actuator acceleration/deceleration data as table data.

Next, description will be made of a basic process of the contrast AF performed by the camera control CPU 206 (camera AF controller 207) and the lens control CPU 110 with reference to FIG. 2. In the following description, the drive of the focus actuator 108 is referred to as "the drive of the focus lens 105".

At step (hereinafter abbreviated as "S") 101, the camera control CPU 206 causes the focus lens 105 through the lens control CPU 110 to perform a wobbling drive that is a minute reciprocatory drive in the optical axis direction. Then, at S102, the camera control CPU 206 determines whether or not having detected a peak position at which the focus evaluation value becomes peak, that is, the in-focus position by the wobbling drive. If having detected the peak position, the camera control CPU 206 proceeds to S107 to enter an AF restart routine.

At S107, the camera control CPU 206 determines whether or not a reperformance of the contrast AF (AF restart) is required because of a significant change of the focus evaluation value signal or change of an aperture value of the aperture stop 103. If the AF restart is not required, the camera control CPU 206 stops the drive of the focus lens 105 at S108. On the other hand, if the AF restart is required, the camera control CPU 206 returns to S101.

On the other hand, if having not detected the peak position at S102, the camera control CPU 206 at S103 drives the focus lens 105 through the lens control CPU 110 in a direction (in-focus direction) in which the focus evaluation value increases. Such a drive of the focus lens 105 in the contrast AF is also referred to as "a peak climbing drive". Then, at S104, the camera control CPU 206 monitors whether or not the focus position has passed over the peak position. If the focus position has not passed over the peak position, the camera control CPU 206 proceeds to S105. At S105, the camera control CPU 206 drives the focus lens 105 to the peak position through the lens control CPU 110.

Next, at S106, the camera control CPU 206 determines whether or not the focus evaluation value has reached the peak. If the focus evaluation value has reached the peak, the camera control CPU 206 reperforms the wobbling drive at S101. On the other hand, if the focus evaluation value has not reached the peak, the camera control CPU 206 at S105 continues the drive of the focus lens 105 to the peak position.

In this embodiment, the camera control CPU 206 utilizes the focus evaluation value signal and the predictive focus position for the wobbling drive of the focus lens 105 and for the determination of whether the focus position has passed over and reached the peak position in the contrast AF.

Next, description will be made of processes respectively performed by the camera control CPU 206 (camera AF controller 207) and the lens control CPU 110 in the contrast AF with reference to a flowchart shown in FIG. 3 and timing charts shown in FIGS. 4 and 5.

Figure 4:
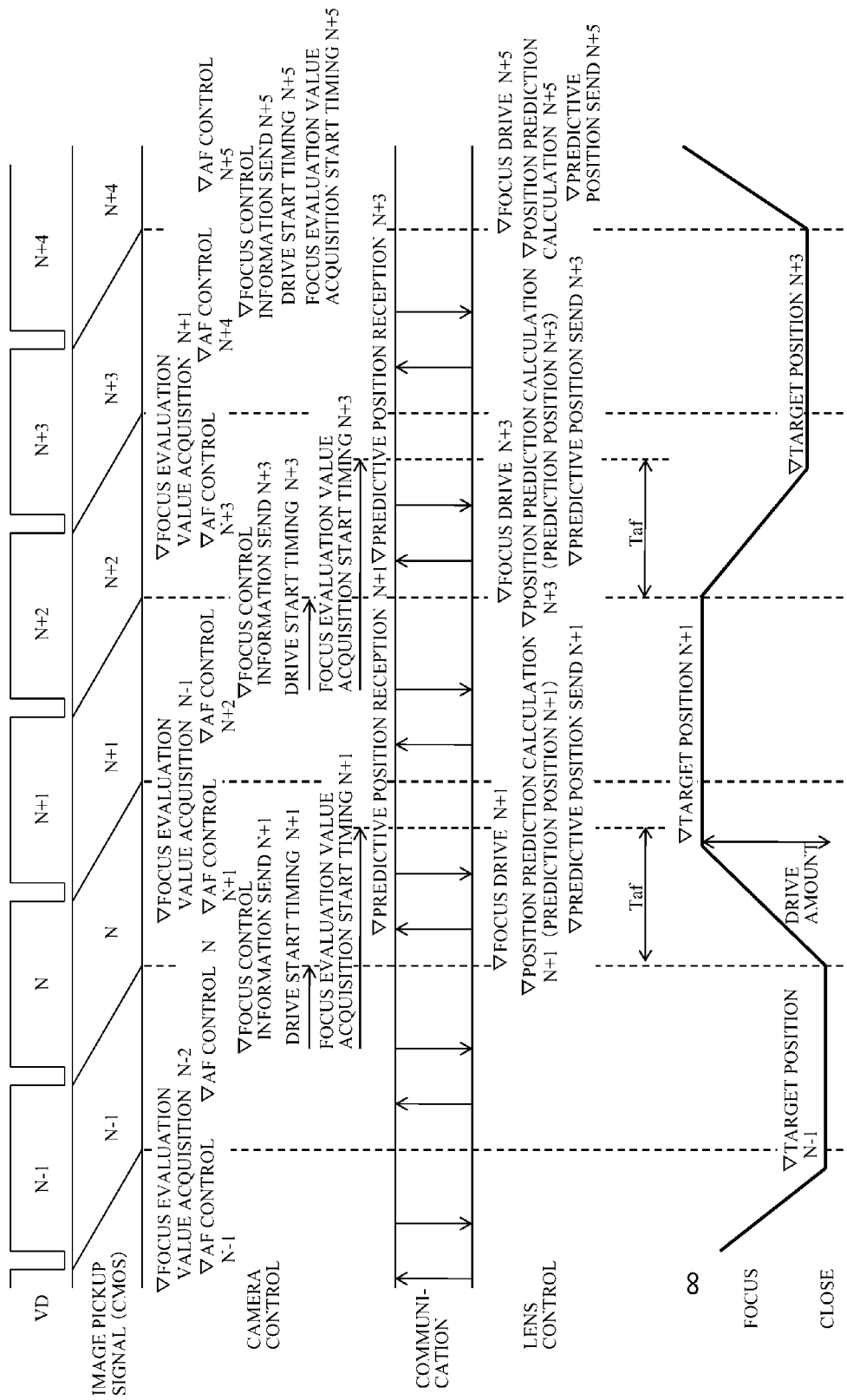
FIGS. 4 and 5 are each a timing chart of the contrast AF in Embodiment 1.
Figure 5:
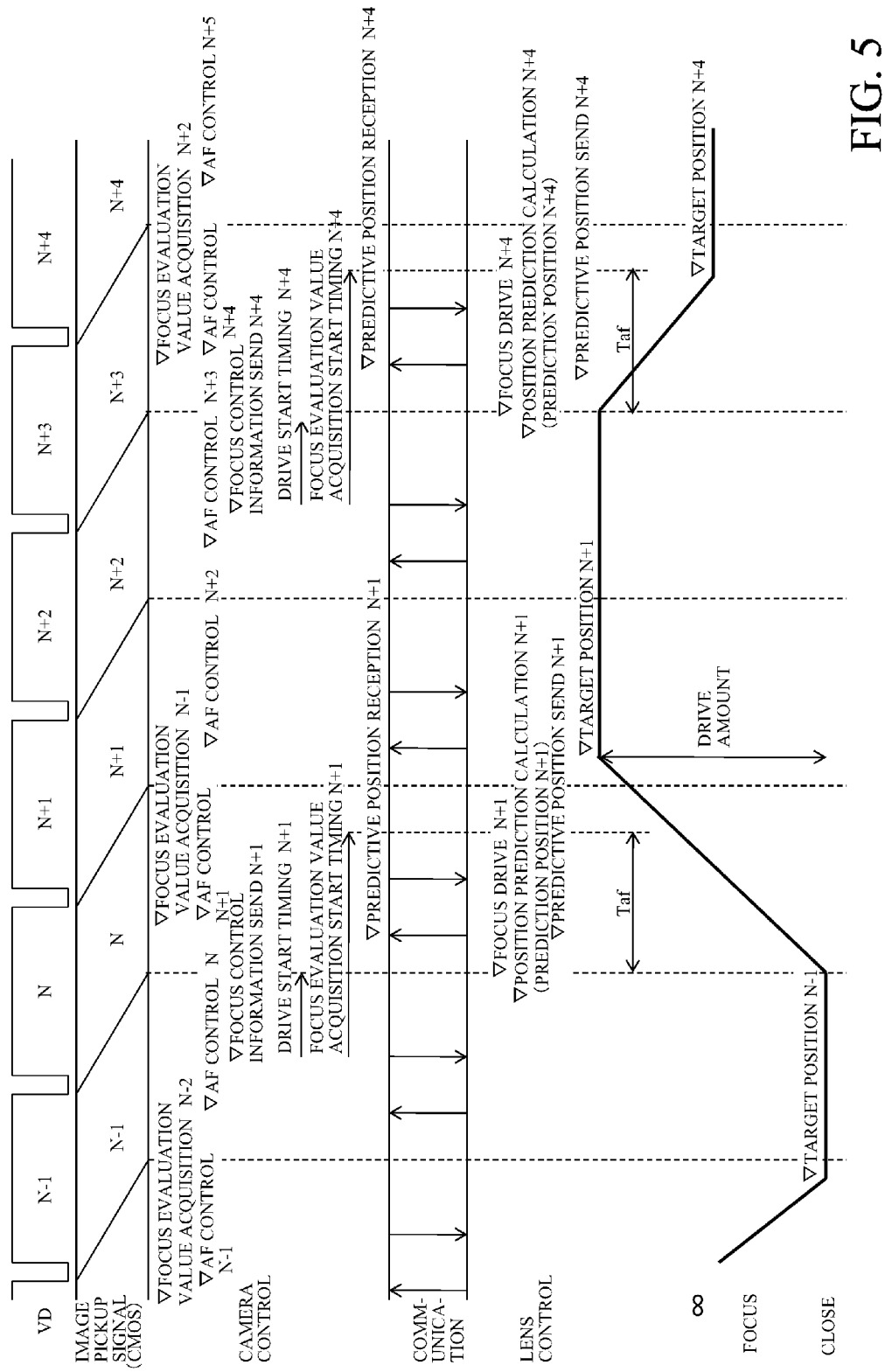

First, at S301, the camera control CPU 206 sends the focus control information to the lens control CPU 110 by the secondary communication, which will be specifically described using FIGS. 4 and 5. The camera control CPU 206 sends, at a focus control information send N+1, a drive start timing N+1 and a focus evaluation value acquisition start timing N+1 that are the timing information, to the lens control CPU 110. Moreover, the camera control CPU 206 also sends a drive start timing N+1 that is the target focus position information to the lens control CPU 110.

At S201, the lens control CPU 110 receives the focus control information and temporarily stores it. After the receipt of the focus control information, at S202, the lens control CPU 110 clears its timer and further sets a timer interrupt so as to enable start of the drive of the focus lens 105 at the drive start timing.

Next, at S203, the lens control CPU 110 performs a position prediction calculation N+1. A predictive focus position obtained at this step is referred to as "a predictive position N+1". In the position prediction calculation, the lens control CPU 110 first performs the reachability determination to predictively determine in terms of time whether or not the focus lens 105 is able to reach the target position N+1 provided by the camera control CPU 206 by the focus evaluation value acquisition start timing N+1. The reachability determination will be described in detail later with reference to FIG. 8. Specifically, the lens control CPU 110 determines whether or not it is possible to drive the focus lens 105 by a drive amount from a current focus position to the target position N+1 within a target drive time period (target time period) Taf from the drive start timing N+1 to the focus evaluation value acquisition start timing N+1. FIG. 4 shows a case where it is possible to drive the focus lens 105 within the target drive time period Taf, and, on the other hand, FIG. 5 shows a case where it is not possible to drive the focus lens 105 within the target drive time period Taf.

Then, the lens control CPU 110 performs, depending on a result of the reachability determination, different position prediction calculations, that is, a calculation of the predictive focus position using the acceleration/deceleration data and a calculation of the predictive focus position without using the acceleration/deceleration data (in other words, a setting of a position identical to the target focus position).

After completion of the position prediction calculation, the lens control CPU 110 at S204 waits for generation of the timer interrupt set S202 and at step S205 starts the drive of the focus lens 105 in response to the generation of the timer interrupt.

Then, at S206, the lens control CPU 110 sends the result of the position prediction calculation (that is, the predictive position) at S203 to the camera control CPU 206 by the primary communication.

At S302, the camera control CPU 206 receives the predictive position from the lens control CPU 110.

Next, at S303, the camera control CPU 206 determines whether a current focus drive mode is a drive mode to perform next drive of the focus lens 105 or a stop mode to acquire the focus evaluation value. If the current focus drive mode is the drive mode, the camera control CPU 206 proceeds to S304. If the current focus drive mode is the stop mode, the camera control CPU 206 proceeds to S308.

At S304, the camera control CPU 206 decides a next target focus position (target position) on a basis of the predictive focus position received at S302. In addition, the camera control CPU 206 decides a next drive start timing of the focus lens 105 at S305.

In addition, the camera control CPU 206 at S306 decides a next focus evaluation value acquisition start timing, and at S307 sets a next focus drive mode to the stop mode.

Next, at S308, the camera control CPU 206 compares the predictive position N+1 with the target position N+1. If the predictive position N+1 coincides with the target position N+1, that is, the focus position is able to reach the target position N+1 by the focus evaluation value acquisition start timing N+1, the camera control CPU 206 acquires a focus evaluation value signal N+1 from an image pickup signal N+1 obtained at a timing VD(N+1) of the vertical synchronization signal (hereinafter referred to as "a vertical synchronization timing) and then stores it. The camera control CPU 206 thus acquires the focus evaluation value signal N+1 at the focus evaluation value acquisition start timing N+1.

Moreover, at S310, the camera control CPU 206 also stores the predictive position N+1 coinciding with the target position N+1.

Then, at S311, the camera control CPU 206 sets the next focus drive mode to the drive mode, and ends the process.

On the other hand, if the predictive position N+1 does not coincide with the target position N+1, that is, the focus position is not able to reach the target position N+1 by the focus evaluation value acquisition start timing N+1 at S308, the camera control CPU 206 temporarily ends the process. Then, as shown in FIG. 5, the camera control CPU 206 acquires, without acquiring the focus evaluation value signal N+1 from the image pickup signal N+1, a focus evaluation value signal N+2 from a next image pickup signal N+2 and then stores it.

Figure 2:
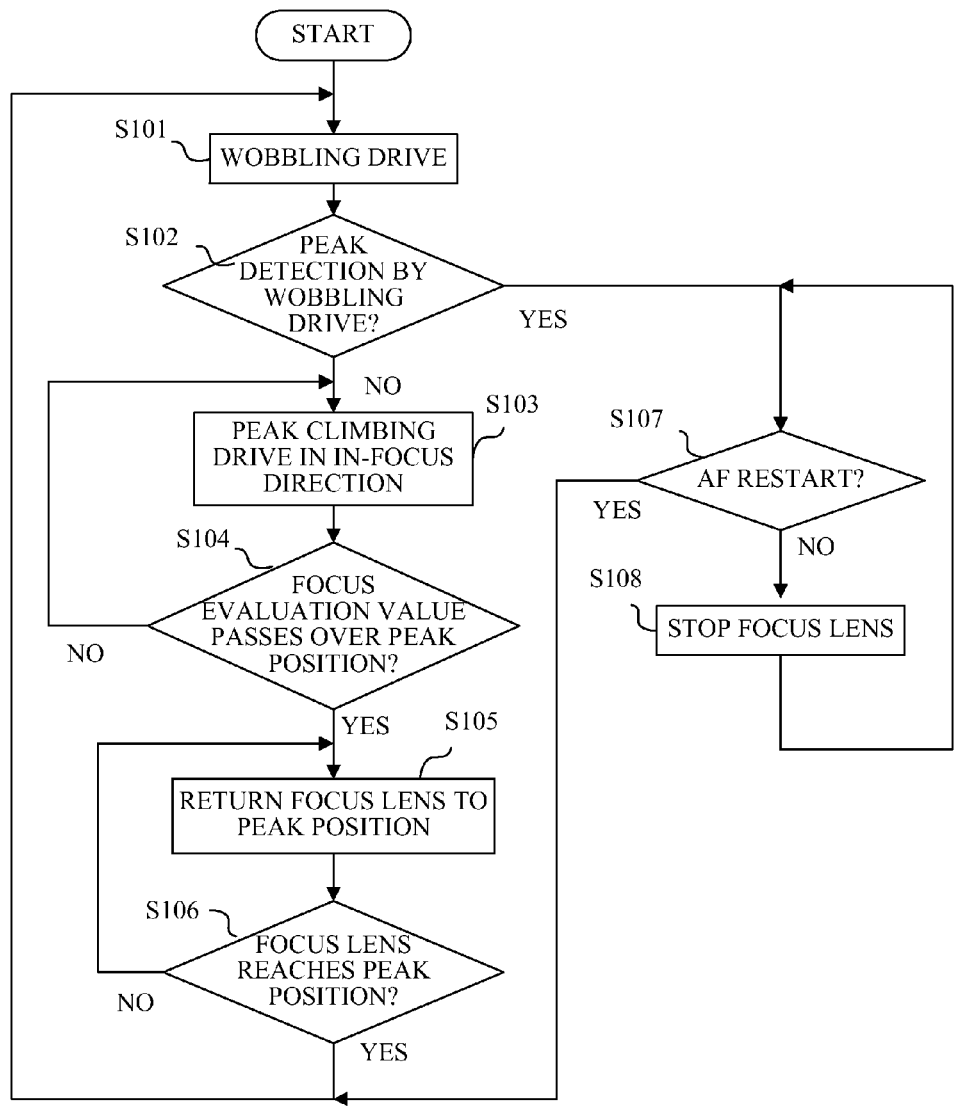
FIG. 2 is a flowchart showing a basic process of contrast AF in Embodiment 1.

The camera control CPU 206 performs the contrast AF described in FIG. 2 by using the focus evaluation value signal and the focus position thus stored.

Figure 3:
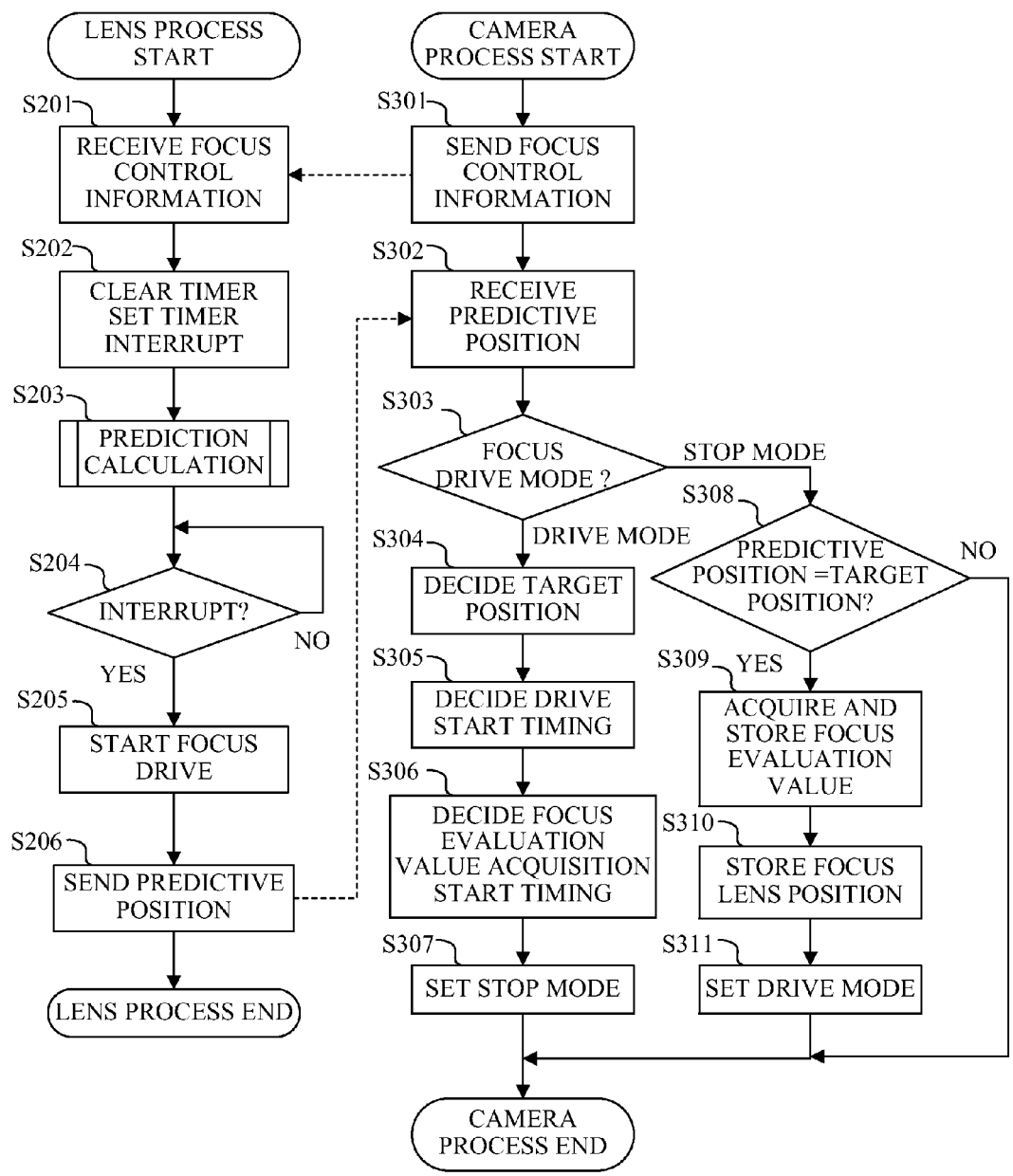
FIG. 3 is a flowchart of a contrast AF process performed by the interchangeable lens and the camera in Embodiment 1.

Moreover, the process shown in FIG. 3 is periodically executed at intervals corresponding to the period of the vertical synchronization timing VD. The primary communication and the secondary communication are periodically performed to execute other processes such as aperture stop control even in a case where the send of the focus control information and the send of the predictive position are not needed (for example, at vertical synchronization signal timings VD(N) and VD(N+2) shown in FIG. 4). In this case, dummy data or data same as that at a previous vertical synchronization timing is sent as the focus control information.

FIG. 3 shows, for simplifying the description, the case where the camera control CPU 206 ends the process when determining at S308 that the focus position is able to reach the target position N+1 by the focus evaluation value acquisition start timing N+1. However, actually, even when the focus position is not able to reach the target position, the focus position can be acquired as the predictive position. Therefore, acquiring and storing the focus evaluation value signal at this predictive position makes it possible to determine whether or not the focus position is brought closer to the peak position in the peak climbing drive. Thus, even when the focus position is not able to reach the target position, acquiring the focus evaluation value signals at the predictive positions at the timings N, N+1, N+2, . . . enables determination of increase and decrease of the focus evaluation value in the peak climbing drive.

Figure 7B:
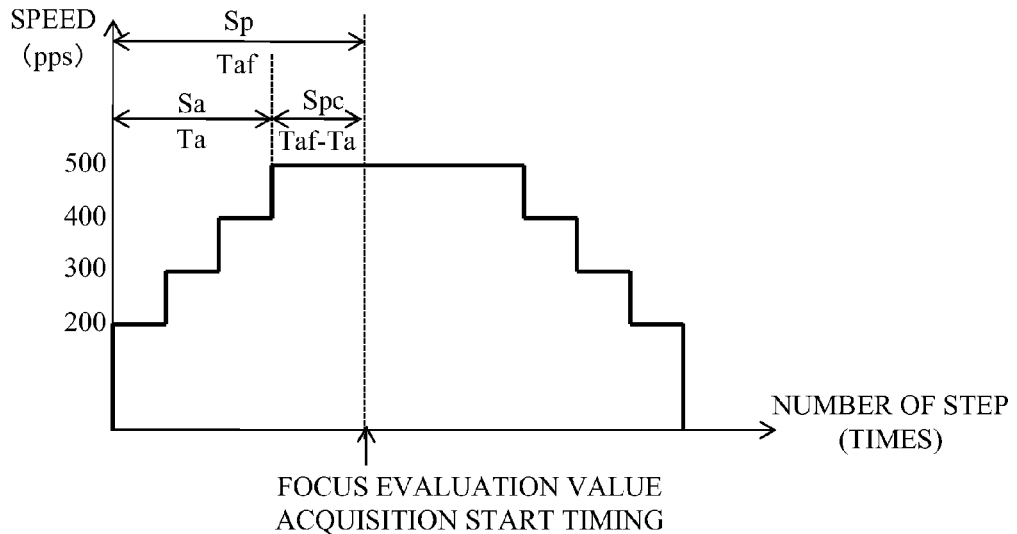
Figure 7C:
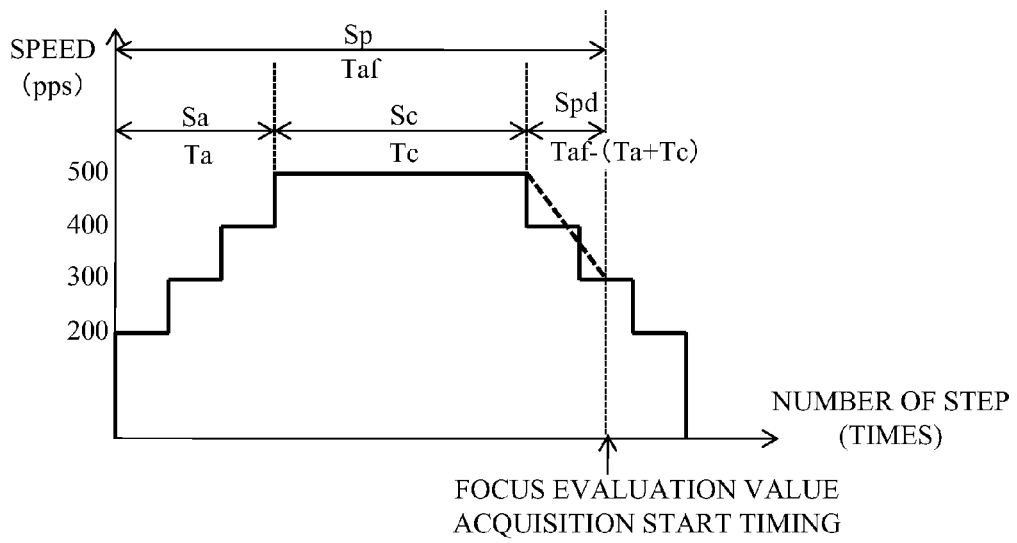

Next, detailed description will be made of the position prediction calculation performed by the lens control CPU 110 at S203 shown in FIG. 3 with reference to a flowchart of FIG. 8. FIGS. 7A to 7C show each a relationship between speed and number of steps (corresponding to time or focus position) when the focus lens 105 is driven by using the acceleration/deceleration data shown in FIG. 6.

Figure 8:
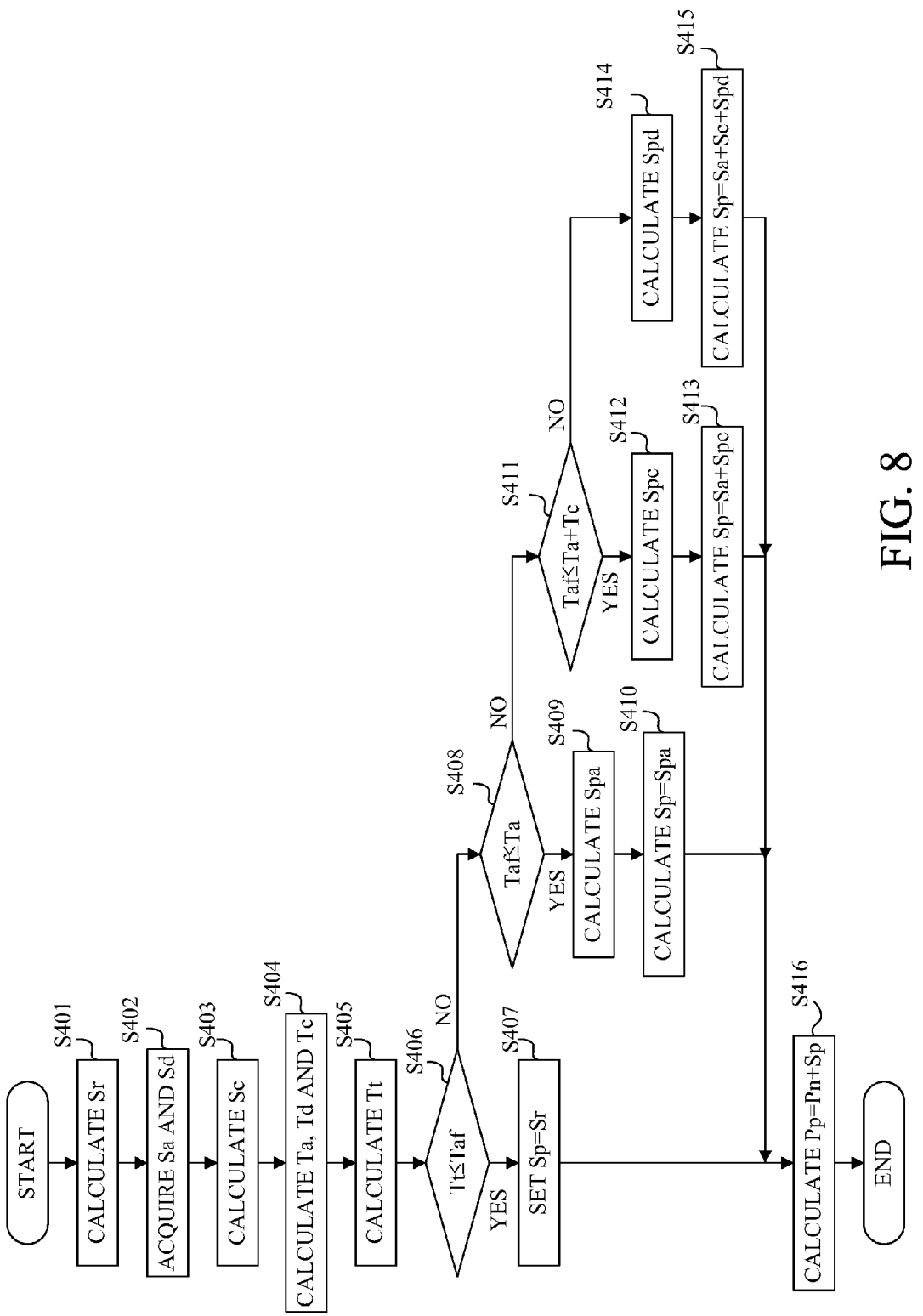
FIG. 8 is a flowchart showing a prediction focus lens position calculation process in Embodiment 1.

At S401 of FIG. 8, the lens control CPU 110 calculates a drive amount (remaining drive amount) Sr of the focus lens 105 corresponding to a difference between the target focus position and a current focus position Pn. The remaining drive amount Sr is calculated by adding a drive error amount due to backlash of the focus actuator 108 itself and of a mechanism that transmits driving force from the focus actuator 108 to the focus lens 105; the backlash is caused when a drive direction of the focus lens 105 (focus actuator 108) is reversed.

Next, at S402, the lens control CPU 110 acquires, from the acceleration/deceleration data stored in the acceleration/deceleration data memory 113, a number of steps (acceleration step number) Sa needed for acceleration of the focus actuator 108 and a number of steps (deceleration step number) Sd needed for deceleration thereof. For example, the lens control CPU 110 acquires an acceleration step number Sa of 3 steps and a deceleration step number Sd of 3 steps from the acceleration/deceleration data shown in FIG. 6. The acceleration/deceleration data shown in FIG. 6 is merely an example, and therefore the acceleration step number Sa may be different from the deceleration step number Sd. Moreover, calculation can be simplified when acceleration and deceleration of the focus lens 105 are not needed.

Next, at S403, the lens control CPU 110 calculates, by using the acceleration step number Sa and the deceleration step number Sd acquired at S402, a number of steps by which the focus lens 105 is to be driven at a constant speed (for example, 500 pps) as follows:

$$Sc = Sr - (Sa + Sd).$$

Next, at S404, the lens control CPU 110 calculates a predictive drive time period Tt that is a predictive time period required for drive of the focus lens 105 by the remaining drive amount Sr in the following three separate time periods: an acceleration time period Ta where an acceleration drive of the focus lens 105 is performed; a deceleration time period Td where a deceleration drive thereof is performed; and a constant speed time period Tc where a constant speed drive thereof is performed. For example, when using the acceleration data shown in FIG. 6, the acceleration time period Ta is calculated as follows:

$$Ta = 1/200 \text{ pps} \times 1 \text{ step} + 1/300 \text{ pps} \times 1 \text{ step} + 1/400 \text{ pps} \times 1 \text{ step}.$$

The deceleration time period Td is calculated similarly to the acceleration time period Ta. Moreover, the constant speed time period Tc is calculated as follows:

$$Tc = 1/500 \text{ pps} \times Sc.$$

Then, at S405, the lens control CPU 110 calculates the predictive drive time period Tt as follows:

$$Tt = Ta + Td + Tc.$$

Next, at S406, the lens control CPU 110 compares the predictive drive time period Tt with the target drive time period Taf. In other words, the lens control CPU 110 determines whether or not the predictive drive time period Tt is equal to or shorter than the target drive time period Taf. If the predictive drive time period Tt is equal to or shorter than the target drive time period Taf, a predictive drive amount Sp is equal to the remaining drive amount Sr (S407), and thus the focus position is able to reach the target focus position by the focus evaluation value acquisition start timing. In this case, the lens control CPU 110 proceeds to S416 to convert the predictive drive amount (relative position) Sp into a predictive position (absolute position) Pp as follows:

$$Pp = Pn + Sp.$$

On the other hand, if the predictive drive time period Tt is longer than the target drive time period Taf, the focus position is not able to reach the target focus position by the focus evaluation value acquisition start timing. The lens control CPU 110 calculates, only in this case, the predictive focus position by using the acceleration/deceleration data at S408 and subsequent steps.

At S408, the lens control CPU 110 performs a determination on an assumption that the focus evaluation value acquisition start timing is during the acceleration drive as shown in FIG. 7A, that is, determines whether or not the target drive time period Taf is equal to or shorter than the acceleration time period Ta. If the focus evaluation value acquisition start timing is during the acceleration drive (that is, the target drive time period Taf is equal to or shorter than the acceleration time period Ta), the lens control CPU 110 calculates a predictive acceleration drive amount Spa at S409 and substitutes it to the predictive drive amount Sp at S410. If the target drive time period Taf is not equal to or shorter than the acceleration time period Ta, the lens control CPU 110 proceeds to S411.

At S411, the lens control CPU 110 performs a determination on an assumption that the focus evaluation value acquisition start timing is during the constant speed drive as shown in FIG. 7B, that is, determines whether or not the target drive time period Taf is equal to or shorter than a time period of Ta+Tc. If the focus evaluation value acquisition start timing is during the constant speed drive (the target drive time period Taf is equal to or shorter than the time period of Ta+Tc), the lens control CPU 110 calculates a predictive constant speed drive amount Spc at S412 and calculates the predictive drive amount Sp (=Sa+Spc) at S413. If the target drive time period Taf is not equal to or shorter than the time period of Ta+Tc, the lens control CPU 110 proceeds to S414.

At S414, the lens control CPU 110 calculates, on an assumption that the focus evaluation value acquisition start timing is during the deceleration drive as shown in FIG. 7C, a predictive deceleration drive amount Spd. Then, at S415, the lens control CPU 110 calculates the predictive drive amount Sp (=Sa+Spc+Spd). Finally, the lens control CPU 110 proceeds to S416 to acquire the predictive focus position.

Description of a method of calculating the predictive drive amounts Spa, Spd and Spc will be made. The predictive acceleration drive amount Spa is a drive amount of the focus lens 105 accelerated during the target drive time period Taf. According to the acceleration data, since the speed is accelerated from 200 pps to 400 pps according to the acceleration data shown in FIG. 6A, the predictive acceleration drive amount Spa can be approximately calculated as follows by using an average speed of 300 pps:

$$Spa = 300 \text{ pps} \times Taf.$$

According to a more strict calculation, since a drive at 400 pps is a drive less than one step, the predictive acceleration drive amount Spa can be calculated as follows with consideration of this drive amount:

$$Spa = 400 \text{ pps} \times [Taf - (1 \text{ step}/200 \text{ pps}) - (1 \text{ step}/300 \text{ pps})] + 1 \text{ step} + 1 \text{ step}.$$

The predictive constant speed drive amount Spc can be calculated as follows since the drive speed is 500 pps:

$$Spc = 500 \text{ pps} \times (Taf - Ta).$$

The predictive deceleration drive amount Spd can be calculated as well as the predictive acceleration drive amount Spa, and therefore description thereof is omitted.

In this embodiment, the lens control CPU 110 performs at S405 the reachability determination to determine in terms of time whether or not the focus position is able to reach the target focus position. Predicting the focus position and then comparing the predictive focus position with the target focus position (that is, performing the reachability determination in terms of position) needs to calculate the predictive drive amounts Spa and Sp in order to calculate the predictive focus position, which makes the calculation complex and thereby increases a processing time required by the lens control CPU 110.

Thus, in this embodiment, the lens control CPU 110 first performs the reachability determination in terms of time and calculates the predictive focus position only when the focus position is not able to reach the target focus position by the focus evaluation value acquisition start timing. This procedure makes it possible not only to perform the process faster when the focus position is able to reach the target focus position, but also to accurately calculate the predictive focus position when the focus position is not able to reach the target focus position.

Moreover, in this embodiment, the lens control CPU 110 calculates, when calculating the target drive time period Tt for performing the reachability determination in terms of time, the acceleration time period Ta and the deceleration time period Td without using approximation calculation. On the other hand, the lens control CPU 110 calculates, when calculating the predictive focus position in the case where the predictive focus position is necessary to be calculated, the predictive acceleration and deceleration drive amounts Sa and Sd by using approximation calculation, which enables faster prediction calculation of the focus position.

Although this embodiment described the case of performing the reachability determination in terms of time, this does not mean that a case of performing a reachability determination in terms of position is eliminated from embodiments of the present invention, that is, the case of performing the reachability determination in terms of position is also included as an embodiment of the present invention.

Moreover, although this embodiment described the case where the information depending on the result of the reachability determination is information on the predictive focus position obtained by different processes depending on the result of the reachability determination, the result of the reachability determination itself may be sent to the camera body as the information depending on the result of the reachability determination.

Embodiment 2

Next, description will be made of a second embodiment (Embodiment 2) of the present invention. Configurations of an interchangeable lens and a camera body are same as those of the interchangeable lens and the camera body in Embodiment 1, and components in Embodiment 2 common to those in Embodiment 1 are denoted by same reference numerals as those in Embodiment 1.

In this embodiment, when performing the contrast AF, the lens control CPU 110 predicts a position of the focus lens 105 (focus position) by using focus actuator acceleration data and focus actuator deceleration data (hereinafter collective referred to as "acceleration/deceleration data) stored in the acceleration/deceleration data memory 113. The acceleration/deceleration data used in this embodiment includes, as shown in FIG. 9, speed information (pps) and time information (sec). That is, the acceleration/deceleration data in this embodiment expresses a drive amount for each speed by a drive time period, which is different from that expressed by the number of steps shown in FIG. 6 in Embodiment 1.

In focus position prediction in this embodiment, the lens control CPU 110 first performs a reachability determination in terms of time, that is, a determination of whether or not the focus position is able to reach a target focus position within a required time period (target drive time period). If no, the lens control CPU 110 calculates a predictive focus position.

Figure 10:
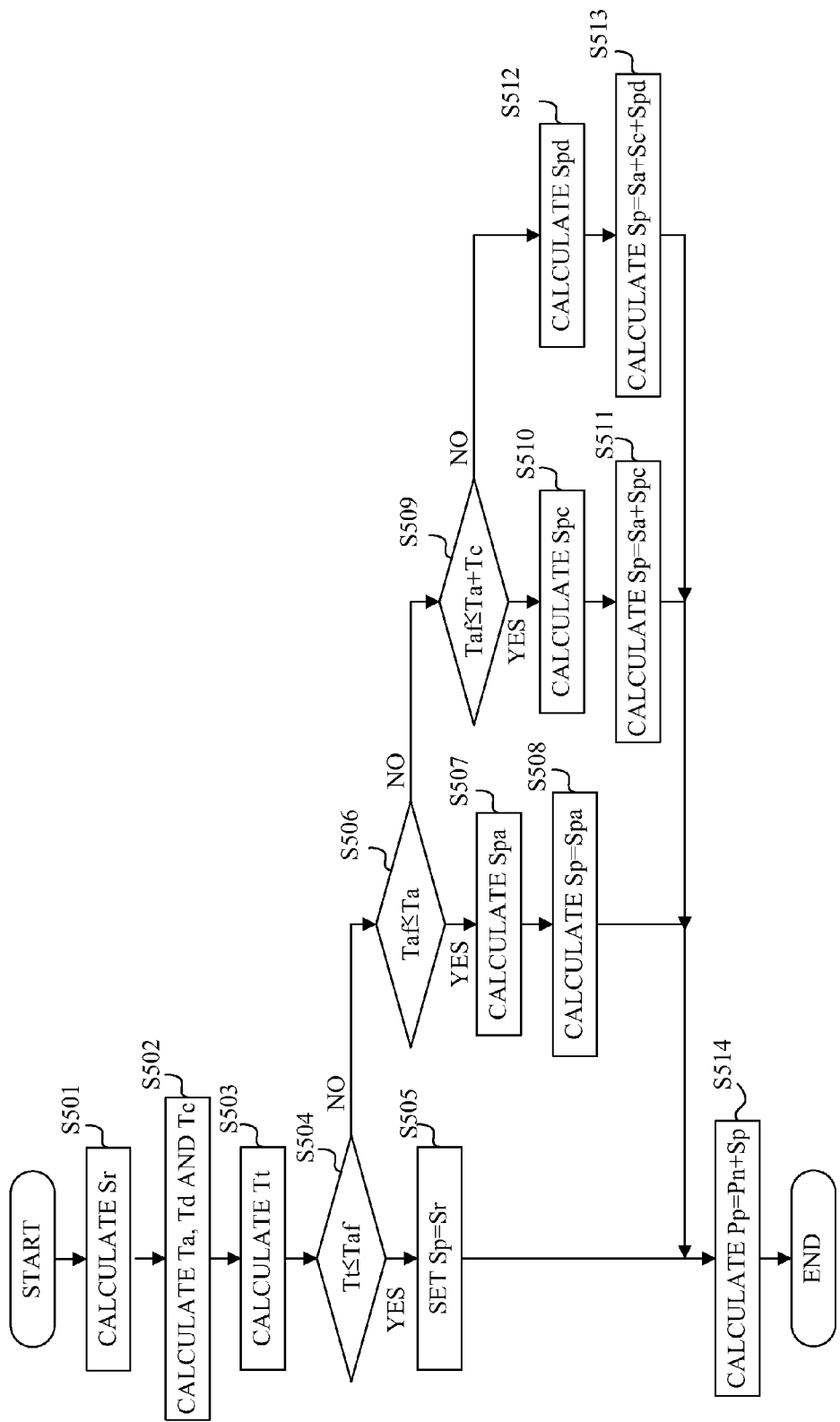
FIG. 10 is a flowchart showing a prediction focus lens position calculation process in Embodiment 1.

Description will be made of a position prediction calculation performed by the lens control CPU 110 with reference to a flowchart shown in FIG. 10. This position prediction calculation is performed in place of the position prediction calculation performed at S203 of FIG. 3 in Embodiment 1.

First, at S501, the lens control CPU 110 calculates a drive amount (remaining drive amount) Sr of the focus lens 105 corresponding to a difference between the target focus position and a current focus position Pn. The remaining drive amount Sr is calculated by adding a drive error amount due to backlash of the focus actuator 108 itself and of a mechanism that transmits driving force from the focus actuator 108 to the focus lens 105; the backlash is caused when a drive direction of the focus lens 105 (focus actuator 108) is reversed.

Next, at S502, the lens control CPU 110 calculates a predictive drive time period Tt that is a predictive time period required for drive of the focus lens 105 by the remaining drive amount Sr in the following three separate time periods: an acceleration time period Ta where an acceleration drive of the focus lens 105 is performed; a deceleration time period Td where a deceleration drive thereof is performed; and a constant speed time period Tc where a constant speed drive thereof is performed. For example, when using the acceleration data shown in FIG. 9, the acceleration time period Ta is calculated as follows:

$$Ta=5\times10^{-3}+5\times10^{-3}+5\times10^{-3}.$$

The deceleration time period Td is calculated similarly to the acceleration time period Ta. Moreover, the constant speed time period Tc is calculated as follows when a total number of steps of the acceleration drive and a total number of steps of the deceleration drive as are respectively represented by Sa and Sd:

$$Tc=[Sr-(Sa+Sd)]/500 \text{ pps}.$$

Then, at S503, the lens control CPU 110 calculates the predictive drive time period Tt as follows:

$$Tt=Ta+Td+Tc.$$

Next, at S504, the lens control CPU 110 compares the predictive drive time period Tt with the target drive time period Taf. In other words, the lens control CPU 110 determines whether or not the predictive drive time period Tt is equal to or shorter than the target drive time period Taf. If the predictive drive time period Tt is equal to or shorter than the target drive time period Taf, a predictive drive amount Sp is equal to the remaining drive amount Sr (S505), and thus the focus position is able to reach the target focus position by the focus evaluation value acquisition start timing. In this case, the lens control CPU 110 proceeds to S514 to convert the predictive drive amount (relative position) Sp into a predictive position (absolute position) Pp as follows:

$$Pp=Pn+Sp.$$

On the other hand, if the predictive drive time period Tt is longer than the target drive time period Taf, the focus position is not able to reach the target focus position by the focus evaluation value acquisition start timing. The lens control CPU 110 calculates, only in this case, the predictive focus position by using the acceleration/deceleration data at S506 and subsequent steps.

At S506, the lens control CPU 110 performs a determination on an assumption that the focus evaluation value acquisition start timing is during the acceleration drive, that is, determines whether or not the target drive time period Taf is equal to or shorter than the acceleration time period Ta. If the focus evaluation value acquisition start timing is during the acceleration drive (the target drive time period Taf is equal to or shorter than the acceleration time period Ta), the lens control CPU 110 calculates a predictive acceleration drive amount Spa at S507 and substitutes it to the predictive drive amount Sp at S508. If the target drive time period Taf is not equal to or shorter than the acceleration time period Ta, the lens control CPU 110 proceeds to S509.

At S509, the lens control CPU 110 performs a determination on an assumption that the focus evaluation value acquisition start timing is during the constant speed drive, that is, determines whether or not the target drive time period Taf is equal to or shorter than a time period of Ta+Tc. If the focus evaluation value acquisition start timing is during the constant speed drive (the target drive time period Taf is equal to or shorter than the time period of Ta+Tc), the lens control CPU 110 calculates a predictive constant speed drive amount Spc at S510 and calculates the predictive drive amount Sp (=Sa+Spc) at S511. If the target drive time period Taf is not equal to or shorter than the time period of Ta+Tc, the lens control CPU 110 proceeds to S512.

At S512, the lens control CPU 110 calculates, on an assumption that the focus evaluation value acquisition start timing is during the deceleration drive, a predictive deceleration drive amount Spd. Then, at S513, the lens control CPU 110 calculates the predictive drive amount Sp (=Sa+Spc+Spd). Finally, the lens control CPU 110 proceeds to S514 to acquire the predictive focus position.

Also in this embodiment, the reachability determination is performed in terms of time at S504, which provides a same effect as that in Embodiment 1. Furthermore, in this embodiment, the drive amount in the acceleration/deceleration data is stored as the drive time period, which enables simplification of the calculation process for the acceleration time period Ta, the deceleration time period Td, the constant speed time period Tc and the predictive drive time period Tt as compared with Embodiment 1.

A combination of the acceleration/deceleration data in Embodiment 1 (FIG. 6) and the acceleration/deceleration data in Embodiment 2 (FIG. 9) may be made to store the speed information, the time information and the step number information as matrix data. This combination enables further simplification of the calculation process for the drive time period Tt.

Embodiment 3

Next, description will be made of a third embodiment (Embodiment 3) of the present invention. Configurations of an interchangeable lens and a camera body are same as those of the interchangeable lens and the camera body in Embodiment 1, and components in Embodiment 3 common to those in Embodiment 1 are denoted by same reference numerals as those in Embodiment 1.

Embodiments 1 and 2 described the case of setting the drive speed of the focus lens 105 in a drive state other than the acceleration drive and the deceleration drive to a constant speed (for example, 500 pps). In contrast thereto, this embodiment calculates the drive speed of the focus lens 105 in the above drive state other than the acceleration drive and the deceleration drive depending on the drive amount thereof and performs the reachability determination and the calculation of the predictive focus position in a case of driving the focus lens 105 at the calculated drive speed.

Figure 11:
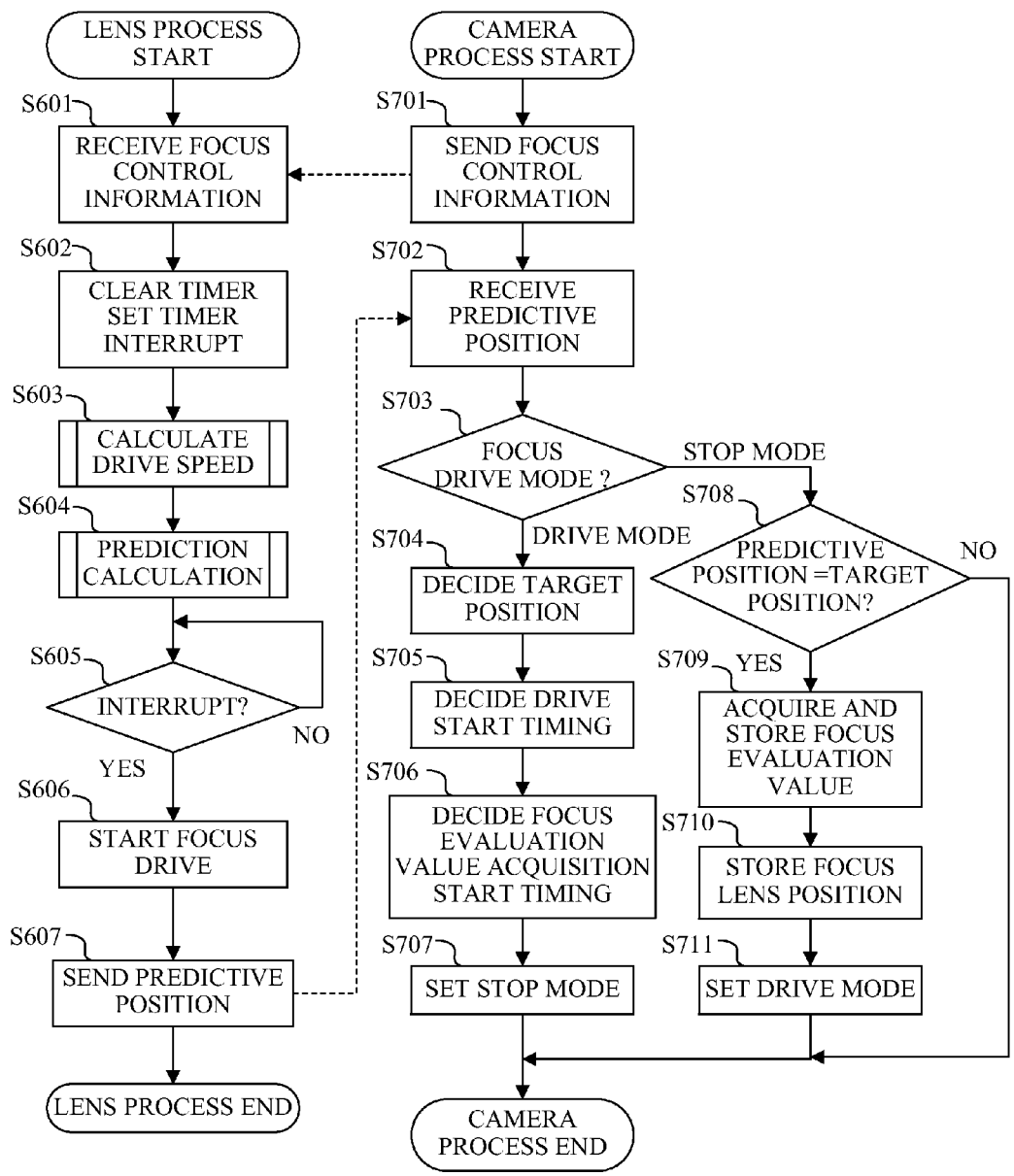
FIG. 11 is a flowchart of a contrast AF process performed in the interchangeable lens and the camera in Embodiment 3 of the present invention.

Description will be made of processes respectively performed by the camera control CPU 206 (camera AF controller 207) and the lens control CPU 110 in the contrast AF with reference to a flowchart shown in FIG. 11.

First, at S701, the camera control CPU 206 sends the focus control information to the lens control CPU 110 by the secondary communication, which will be specifically described using FIGS. 4 and 5 also used in Embodiment 1. The camera control CPU 206 sends, at a focus control information send N+1, a drive start timing N+1 of the focus lens 105 and a focus evaluation value acquisition start timing N+1 that are the timing information to the lens control CPU 110. Moreover, the camera control CPU 206 also sends a drive start timing N+1 that is the target focus position (target focus evaluation value acquisition position) information to the lens control CPU 110.

At S601, the lens control CPU 110 receives the focus control information to temporarily store it. After the receipt of the focus control information, at S602, the lens control CPU 110 clears its timer and further sets a timer interrupt so as to enable start of the drive of the focus lens 105 at the drive start timing.

Next, at S603, the lens control CPU 110 calculates a drive speed of the focus lens 105. The drive speed herein is a drive speed at which the focus lens 105 is able to reach the target focus position within a target drive time period Taf from the drive start timing to the focus evaluation value acquisition start timing. Although the drive speed in Embodiments 1 and 2 is fixed to 500 pps, the drive speed in this embodiment is changed depending on the drive amount of the focus lens 105. Specifically, the drive speed is decreased as the drive amount becomes small, thereby enabling reduction of noise (vibration) generated during the drive of the focus lens 105. The process at S603 will be described in detail later with reference to FIG. 12.

Next, at S604, the lens control CPU 110 performs a position prediction calculation N+1. A predictive focus position obtained at this step is referred to as "a predictive position N+1". In the position prediction calculation, the lens control CPU 110 first performs the reachability determination to predictively determine in terms of time whether or not the focus lens 105 is able to reach the target position N+1 provided by the camera control CPU 110 by the focus evaluation value acquisition start timing N+1, which will be described in detail later with reference to FIG. 14. Specifically, the lens control CPU 110 determines whether or not it is possible to drive the focus lens 105 by a drive amount from a current focus position to the target position N+1 within a target drive time period (target time period) Taf from the drive start timing N+1 to the focus evaluation value acquisition start timing N+1. FIG. 4 shows a case where it is possible to drive the focus lens 105 within the target drive time period Taf, and, on the other hand, FIG. 5 shows a case where it is not possible to drive the focus lens 105 within the target drive time period Taf.

Then, the lens control CPU 110 performs, depending on a result of the reachability determination, different position prediction calculations, that is, a calculation of the predictive focus position using the acceleration/deceleration data and a calculation of the predictive focus position without using the acceleration/deceleration data (in other words, a setting of a position identical to the target focus position).

After completion of the position prediction calculation, the lens control CPU 110 at S605 waits for generation of the timer interrupt set at S602 and at step S606 starts the drive of the focus lens 105 in response to the generation of the timer interrupt.

Then, at S607, the lens control CPU 110 sends the result of the position prediction calculation (that is, the predictive position) at S604 to the camera control CPU 206 by the primary communication.

At S702, the camera control CPU 206 receives the predictive position from the lens control CPU 110.

Thereafter, the camera control CPU 206 performs the contrast AF at S703 to S711 by same processes as those at S303 to S311 of FIG. 3. Description of S703 to S711 is omitted.

Next, description will be made of the calculation of the drive speed performed at S603 by the lens control CPU 110 with reference to FIG. 12. FIGS. 13A to 13C show each a relationship between speed and number of steps (corresponding to time and focus position) when driving the focus lens 105.

Figure 12:
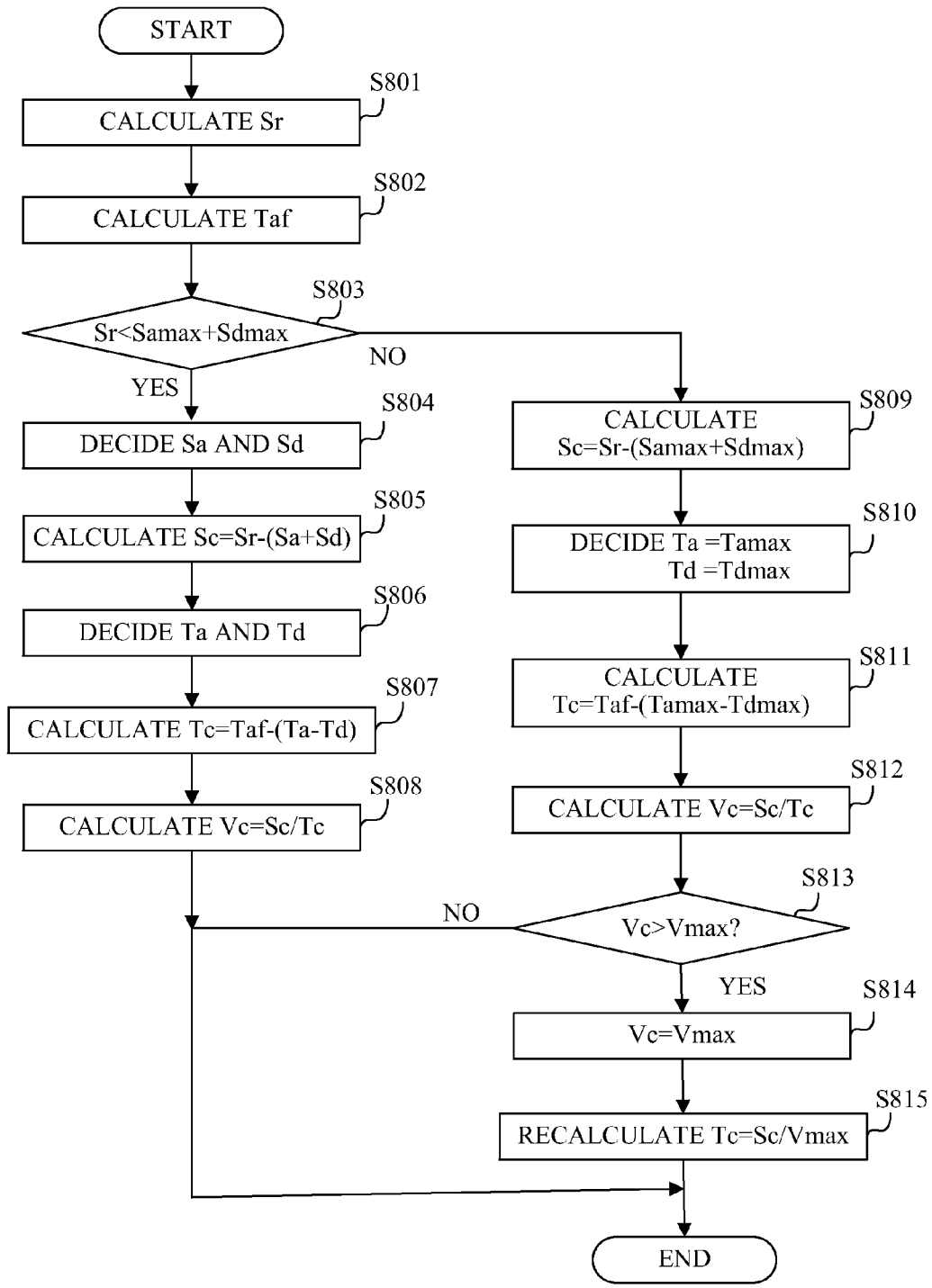
FIG. 12 is a flowchart showing a focus lens drive speed calculation process in Embodiment 3.
Figure 13A:
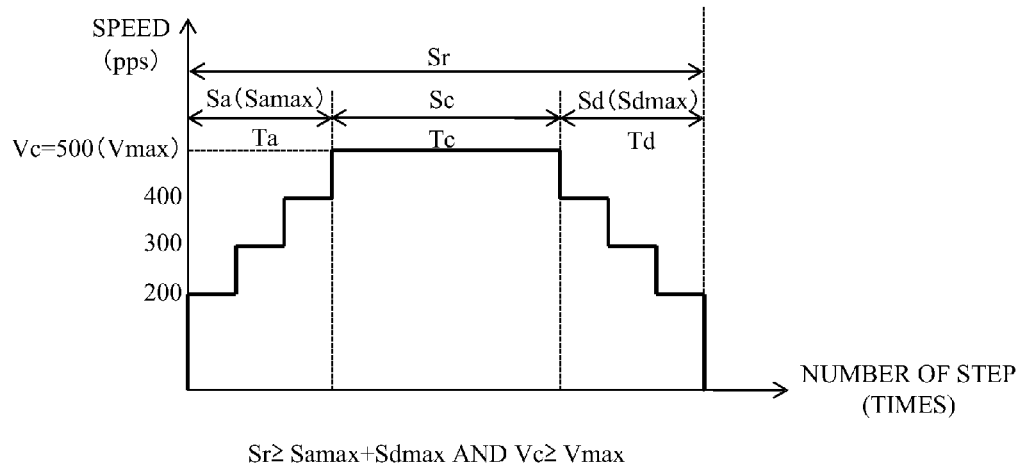
FIGS. 13A to 13C show focus lens driving patterns for respective focus lens drive speeds in Embodiment 3.
Figure 13B:
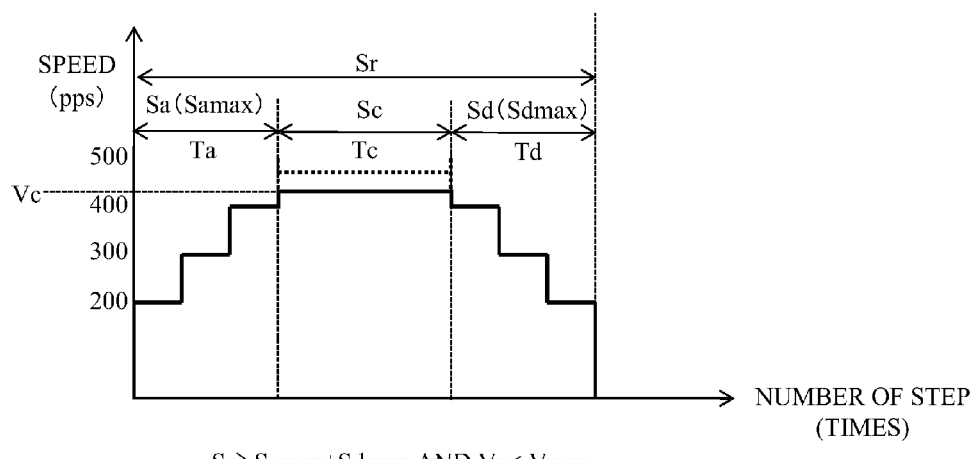
Figure 13C:
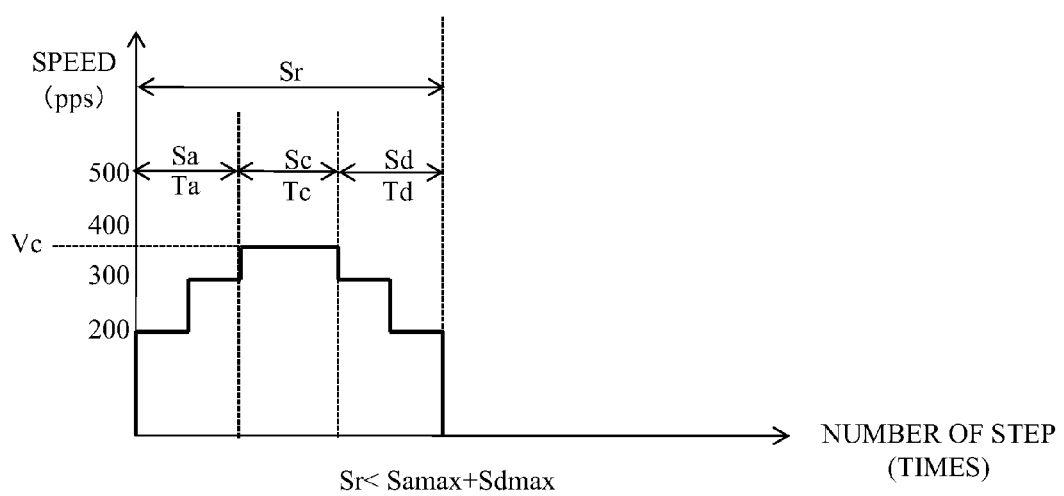

At S801 of FIG. 12, the lens control CPU 110 calculates a drive amount (remaining drive amount) Sr of the focus lens 105 corresponding to a difference between the target focus position and a current focus position Pn. The remaining drive amount Sr is calculated by adding a drive error amount due to backlash of the focus actuator 108 itself and of a mechanism that transmits driving force from the focus actuator 108 to the focus lens 105; the backlash is caused when a drive direction of the focus lens 105 (focus actuator 108) is reversed.

Next, at S802, the lens control CPU 110 calculates, from the drive start timing and the focus evaluation value acquisition start timing, a target drive time period Taf to drive the focus lens 105.

Next, at S803, the lens control CPU 110 determines, as shown below, whether or not the remaining drive amount Sr is smaller than a sum of a total number of steps of the acceleration drive (total acceleration step number) Samax and a total number of steps of the deceleration drive (total deceleration step number) Sdmax:

$$Sr < Samax + Sdmax.$$

If the remaining drive amount Sr is smaller than the sum, the lens control CPU 110 proceeds to S804 to decide, by using the acceleration/deceleration data, an acceleration step number Sd to be used for the acceleration drive and a deceleration step number Sa to be used for the deceleration drive.

Moreover, at S805, the lens control CPU 110 calculates a constant speed step number Sc to be used for the constant-speed drive as follows:

$$Sc = Sr - (Sa + Sd).$$

For example, when the remaining drive amount Sr is 5 steps, a number of steps of 2 is assigned to each of the acceleration drive and the deceleration drive, and a remaining number of steps of 1 is assigned to the constant speed drive to drive the focus lens 105 at a constant speed Vc. The drive of the focus lens 105 in this example is shown in FIG. 13C.

Then, at S806, the lens control CPU 110 decides, as well as the number of steps, drive time periods for the acceleration drive and the deceleration drive (acceleration time period and deceleration time period) Ta and Td on the basis of the acceleration/deceleration data.

Thereafter, at S807, the lens control CPU 110 calculates the constant speed drive time Tc by using the target drive time period Taf as follows:

$$Tc=Taf-(Ta+Td).$$

Next, at S808, the lens control CPU 110 calculates the constant drive speed Vc as follows:

$$Vc=Sc/Tc.$$

Then, the lens control CPU 110 performs control of the drive and stop of the focus lens 105 on a basis of the constant drive speed Vc and the acceleration/deceleration data.

On the other hand, when the remaining drive amount Sr is equal to or greater than the above-mentioned sum (that is, Sr≥Samax+Sdmax) at S803, the lens control CPU 110 at S809 calculates the constant speed step number Sc as follows:

$$Sc=Sr-(Samax+Sdmax).$$

Furthermore, at S810, the lens control CPU 110 decides, by using the acceleration/deceleration data, a total time period (total acceleration time period) Tdmax for the acceleration drive and a total time period (total deceleration time period) Tdmax for the deceleration drive.

Next, at S811, the lens control CPU 110 calculates, as well as at S807, the constant speed drive time Tc as follows:

$$Tc=Taf-(Tamax+Tdmax).$$

Then, at S812, the lens control CPU 110 calculates, as well as at S808, the constant drive speed Vc.

Furthermore, at step S813, the lens control CPU 110 determines whether or not the calculated constant drive speed Vc is higher than a maximum drive speed Vmax allowed for the focus actuator 108. The maximum drive speed Vmax is a limit speed decided from standards relating to torque and vibration (noise) of the focus actuator 108. If the constant drive speed Vc is higher than the maximum drive speed Vmax, the lens control CPU 110 proceeds to S814 to limit the constant drive speed Vc up to the maximum drive speed Vmax as shown in FIG. 13A and recalculates the constant speed drive time Tc. On the other hand, if the constant drive speed Vc is equal to or lower than the maximum drive speed Vmax, the lens control CPU 110 ends the process.

Figure 14:
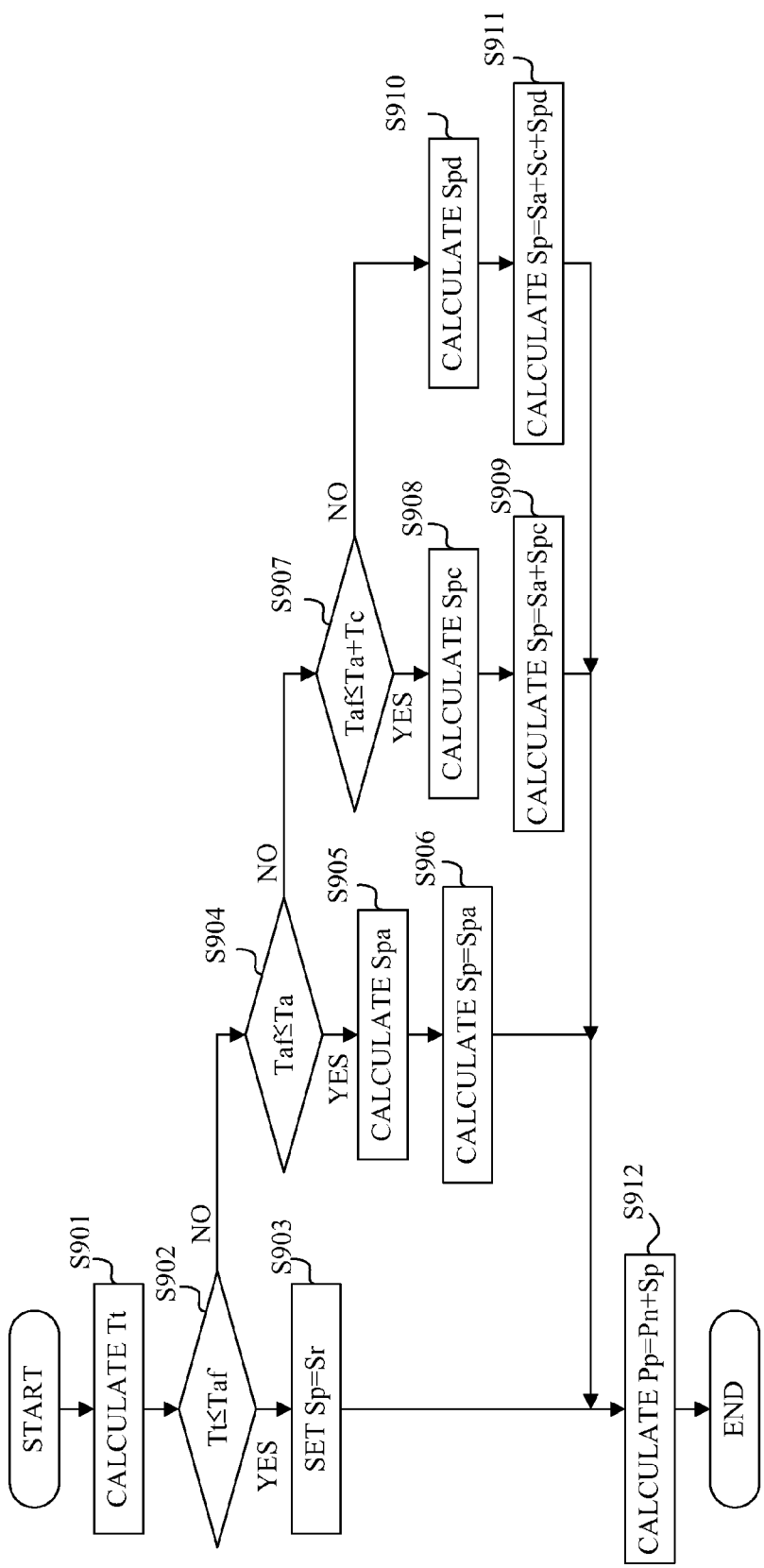
FIG. 14 is a flowchart showing a prediction focus lens position calculation process in Embodiment 3.

Next, detailed description will be made of the position prediction calculation performed by the lens control CPU 110 at S604 of FIG. 11 with reference to a flowchart of FIG. 14.

First, at S901, the lens control CPU 110 calculates, by using the acceleration time Ta, the deceleration time Td and the constant speed time Tc calculated by the process shown by the flowchart of FIG. 12, a predictive drive time period Tt required for the drive of the focus lens 105 as follows:

$$Tt=Ta+Td+Tc.$$

Next, at S902, the lens control CPU 110 compares the predictive drive time period Tt with the target drive time period Taf. In other words, the lens control CPU 110 determines whether or not the predictive drive time period Tt is equal to or shorter than the target drive time period Taf. If the predictive drive time period Tt is equal to or shorter than the target drive time period Taf, a predictive drive amount Sp is equal to the remaining drive amount Sr, and thus the focus position is able to reach the target focus position by the focus evaluation value acquisition start timing (S903). In this case, the lens control CPU 110 proceeds to S912 to convert the predictive drive amount (relative position) Sp into a predictive position (absolute position) Pp as follows:

$$Pp=Pn+Sp.$$

The remaining drive amount Sr herein may be a value calculated by the process shown by the flowchart of FIG. 12.

On the other hand, if the predictive drive time period Tt is longer than the target drive time period Taf, the focus position is not able to reach the target focus position by the focus evaluation value acquisition start timing. The lens control CPU 110 calculates, only in this case, the predictive focus position by using the acceleration/deceleration data at S904 and subsequent steps.

At S904, the lens control CPU 110 performs a determination on an assumption that the focus evaluation value acquisition start timing is during the acceleration drive, that is, determines whether or not the target drive time period Taf is equal to or shorter than the acceleration time period Ta. If the focus evaluation value acquisition start timing is during the acceleration drive (the target drive time period Taf is equal to or shorter than the acceleration time period Ta), the lens control CPU 110 calculates a predictive acceleration drive amount Spa at S905 and substitutes it to the predictive drive amount Sp at S906. If the target drive time period Taf is not equal to or shorter than the acceleration time period Ta, the lens control CPU 110 proceeds to S907.

At S907, the lens control CPU 110 performs a determination on an assumption that the focus evaluation value acquisition start timing is during the constant speed drive, that is, determines whether or not the target drive time period Taf is equal to or shorter than a time period of Ta+Tc. If the focus evaluation value acquisition start timing is during the constant speed drive (the target drive time period Taf is equal to or shorter than the time period of Ta+Tc), the lens control CPU 110 calculates a predictive constant speed drive amount Spc at S908 and calculates the predictive drive amount Sp (=Sa+Spc) at S909. If the target drive time period Taf is not equal to or shorter than the time period of Ta+Tc, the lens control CPU 110 proceeds to S910.

At S910, the lens control CPU 110 calculates, on an assumption that the focus evaluation value acquisition start timing is during the deceleration drive, a predictive deceleration drive amount Spd. Then, at S911, the lens control CPU 110 calculates the predictive drive amount Sp (=Sa+Spc+Spd). Finally, the lens control CPU 110 proceeds to S912 to acquire the predictive focus position.

According to this embodiment, since the calculation is made by using the drive time periods Ta, Td and Tc and the acceleration and deceleration step numbers Sa and Sd which have already been calculated by the process shown in FIG. 12, the calculation process can be more simplified as compared with Embodiment 1. Moreover, a combination of this embodiment with Embodiments 1 and 2 also enable further simplification of the calculation process for calculating the various time periods.

Although each of the above embodiments described the case of storing the acceleration/deceleration data as table data, the acceleration/deceleration data may be stored as a calculating formula, and the acceleration/deceleration data to be used may be calculated when it is needed.

According to the above-described embodiments, an interchangeable lens cane be achieved which enables a lens-interchangeable image pickup apparatus to acquire the focus information used in the contrast AF at appropriate focus lens positions and thereby enables the image pickup apparatus to perform good contrast AF with high speed.

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures and functions.

This application claims the benefit of Japanese Patent Application No. 2012-097893, filed on Apr. 23, 2012, which is hereby incorporated by reference herein in its entirety.

What is claimed is:

1. An interchangeable lens detachable from an image pickup apparatus and capable of communication with the image pickup apparatus, the interchangeable lens comprising:
an image pickup optical system including a focus lens;
a focus actuator to move the focus lens;
a memory to store speed control data to be used for control of drive speed of the focus actuator; and
a lens controller configured to control the drive speed of the focus actuator by using the speed control data,
wherein the image pickup apparatus comprises:
an image sensor to photoelectrically convert an object image formed by the image pickup optical system to produce an image pickup signal; and
a focus controller configured to acquire, by using the image pickup signal, focus information corresponding to image contrast that changes with movement of the focus lens and to control a focusing movement of the focus lens to an in-focus position by using the focus information, and
wherein the lens controller is configured (a) to receive, from the focus controller, timing information showing a timing relating to acquisition of the focus information, (b) to perform a reachability determination for determining, by using the timing information and the speed control data, whether or not the focus lens is able to reach a target focus information acquisition position at which the focus controller acquires the focus information by a scheduled focus information acquisition timing, (c) to perform, when determining in the reachability determination that the focus lens is not able to reach the target focus information acquisition position by the scheduled focus information acquisition timing, calculation of a predictive position of the focus lens at the scheduled focus information acquisition timing by using the speed control data and (d) to send the predictive position to the focus controller.

2. An interchangeable lens according to claim 1, wherein the lens controller is configured to add an amount of backlash caused when the focus actuator reverses a drive direction of the focus lens, to a movement amount of the focus lens to the target focus information acquisition position.

3. An interchangeable lens according to claim 1, wherein the lens controller is configured to be capable of setting, as drive modes of the focus actuator, an acceleration drive, a constant speed drive and a deceleration drive, and
wherein the lens controller is configured to decrease, when determining in the reachability determination that the focus lens is not able to reach the target focus information acquisition position by the scheduled focus information acquisition time, the drive speed of the focus actuator in the constant speed drive depending on a movement amount of the focus lens to the target focus information acquisition position.

4. An interchangeable lens according to claim 1, wherein the lens controller is configured (a) to receive, from the focus controller, as the timing information, information showing a movement start timing for starting the focusing movement of the focus lens and information showing the scheduled focus information acquisition timing, (b) to compare a predictive time period from the movement start timing to a time at which the focus lens reaches the target focus information acquisition position, with a target time period from the movement start timing to the scheduled focus information acquisition timing, (c) to perform, only when determining that the predictive time period is longer than the target time period, the calculation of the predictive position of the focus lens at the scheduled focus information acquisition timing by using the speed control data, and (d) to send the predictive position to the focus controller.

5. An interchangeable lens according to claim 1, wherein the lens controller is configured (a) to receive from the focus controller, before the reachability determination, the information showing the target focus information acquisition position and (b) to send, when determining in the reachability determination that the focus lens is able to reach the target focus information acquisition position by the scheduled focus information acquisition time, the target focus information acquisition position to the focus controller.

6. A control method for an interchangeable lens detachable from an image pickup apparatus and capable of communication with the image pickup apparatus, the interchangeable lens comprising: an image pickup optical system including a focus lens; and a focus actuator to move the focus lens, and the image pickup apparatus comprising: an image sensor to photoelectrically convert an object image formed by the image pickup optical system to produce an image pickup signal; and a focus controller configured to acquire, by using the image pickup signal, focus information corresponding to image contrast that changes with movement of the focus lens and to control a focusing movement of the focus lens to an in-focus position by using the focus information, the method comprising:
providing speed control data to be used for control of drive speed of the focus actuator;
controlling the drive speed of the focus actuator by using the speed control data;
receiving, from the focus controller, timing information showing a timing relating to acquisition of the focus information;
performing a reachability determination for determining, by using the timing information and the speed control data, whether or not the focus lens is able to reach a target focus information acquisition position at which the focus controller acquires the focus information by a scheduled focus information acquisition timing;
performing, when determining in the reachability determination that the focus lens is not able to reach the target focus information acquisition position by the scheduled focus information acquisition timing, calculation of a predictive position of the focus lens at the scheduled focus information acquisition timing by using the speed control data; and
sending the predictive position to the focus controller.

7. An image pickup apparatus from which an interchangeable lens is detachable and which is capable of communication with the interchangeable lens, the interchangeable lens comprising: an image pickup optical system including a focus lens; a focus actuator to move the focus lens; a memory to store speed control data to be used for control of drive speed of the focus actuator; and a lens controller configured to control the drive speed of the focus actuator by using the speed control data, the image pickup apparatus comprising:
  an image sensor to photoelectrically convert an object image formed by the image pickup optical system to produce an image pickup signal; and
  a focus controller configured to acquire, by using the image pickup signal, focus information corresponding to image contrast that changes with movement of the focus lens, and to control a focusing movement of the focus lens to an in-focus position by using the focus information,
  wherein the focus controller is configured to send, to the lens controller, timing information showing a timing relating to acquisition of the focus information,
  wherein the lens controller is configured (a) to perform a reachability determination for determining, by using the timing information and the speed control data, whether or not the focus lens is able to reach a target focus information acquisition position at which the focus controller acquires the focus information by a scheduled focus information acquisition timing, (b) to perform, when determining in the reachability determination that the focus lens is not able to reach the target focus information acquisition position by the scheduled focus information acquisition timing, calculation of a predictive position of the focus lens at the scheduled focus information acquisition timing by using the speed control data and (c) to send the predictive position to the focus controller,
  wherein the focus controller is configured to control the focusing movement of the focus lens on a basis of the received predictive position and the focus information acquired at the scheduled focus information acquisition timing.

8. A control method for an image pickup apparatus from which an interchangeable lens is detachable and which is capable of communication with the interchangeable lens, the interchangeable lens comprising: an image pickup optical system including a focus lens; and a focus actuator to move the focus lens and being capable of controlling drive speed of the focus actuator by using speed control data stored in a memory, and the image pickup apparatus comprising: an image sensor to photoelectrically convert an object image formed by the image pickup optical system to produce an image pickup signal; and a focus controller configured to acquire, by using the image pickup signal, focus information corresponding to image contrast that changes with movement of the focus lens and to control a focusing movement of the focus lens to an in-focus position by using the focus information, the method comprising:
  sending, to the interchangeable lens, timing information showing a timing relating to acquisition of the focus information,
  receiving a predictive position of the focus lens from the interchangeable lens (a) performing a reachability determination for determining, by using the timing information and the speed control data, whether or not the focus lens is able to reach a target focus information acquisition position at which the focus controller acquires the focus information by a scheduled focus information acquisition timing and (b) calculating, when determining in the reachability determination that the focus lens is not able to reach the target focus information acquisition position by the scheduled focus information acquisition timing, the predictive position of the focus lens at the scheduled focus information acquisition timing by using the speed control data; and
  controlling the focusing movement of the focus lens on a basis of the received predictive position and the focus information acquired at the scheduled focus information acquisition timing.

* * * * *